US 12,446,739 B2

(12) United States Patent
Conrad

(10) Patent No.: US 12,446,739 B2
(45) Date of Patent: Oct. 21, 2025

(54) HAND VACUUM CLEANER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 419 days.

(21) Appl. No.: 17/401,180

(22) Filed: Aug. 12, 2021

(65) Prior Publication Data

US 2021/0369065 A1  Dec. 2, 2021

Related U.S. Application Data

(63) Continuation of application No. 15/015,036, filed on Feb. 3, 2016, now Pat. No. 11,253,119, which is a (Continued)

(30) Foreign Application Priority Data

Mar. 11, 2009  (CA) ..................... 2658029
Mar. 11, 2009  (CA) ..................... 2658048

(51) Int. Cl.
*A47L 5/24*  (2006.01)
*A47L 9/00*  (2006.01)
(Continued)

(52) U.S. Cl.
CPC ................ *A47L 5/24* (2013.01); *A47L 9/00* (2013.01); *A47L 9/106* (2013.01); *A47L 9/1691* (2013.01)

(58) Field of Classification Search
CPC ... A47L 5/24; A47L 5/28; A47L 5/362; A47L 9/10; A47L 9/102; A47L 9/165; A47L 9/1608; A47L 9/1666
See application file for complete search history.

(56) References Cited

U.S. PATENT DOCUMENTS

| 280,033 A | 6/1883 | Hadley |
| 1,902,472 A | 3/1933 | Tuteur et al. |

(Continued)

FOREIGN PATENT DOCUMENTS

| CA | 1218962 A1 | 3/1987 |
| CA | 2086374 C | 11/1996 |

(Continued)

OTHER PUBLICATIONS

What's the Best Vacuum.com—Forum discussion Dyson DC16 Root 6 Hand Held Vacuum Cleaner; dated Oct. 21, 2006.
(Continued)

*Primary Examiner* — Brian D Keller
*Assistant Examiner* — John C Merino
(74) *Attorney, Agent, or Firm* — Philip C. Mendes da Costa; SMART & BIGGAR LP

(57) ABSTRACT

A hand vacuum cleaner having a main body and a cyclonic air treatment stage wherein the pre-motor filter has an outer perimeter defining a volume and the cyclone axis and the motor axis each extend through a central portion of the volume and wherein the post-motor filter has a curved outer perimeter that defines a volume, the volume has a radially inner central portion and the cyclone axis and the motor axis each extend through the central portion of the volume.

18 Claims, 9 Drawing Sheets

Related U.S. Application Data continuation of application No. 13/255,858, filed as application No. PCT/CA2010/000340 on Mar. 9, 2010, now Pat. No. 9,591,952.

(51) Int. Cl.
*A47L 9/10* (2006.01)
*A47L 9/16* (2006.01)

(56) References Cited

U.S. PATENT DOCUMENTS

| | | |
|---|---|---|
| 2,071,975 A | 2/1937 | Holm-Hansen et al. |
| 2,533,057 A | 12/1950 | Senne |
| 2,542,634 A | 2/1951 | Davis et al. |
| 2,559,384 A | 7/1951 | Anderson, Jr. |
| 2,621,756 A | 12/1952 | Senne |
| 2,632,524 A | 3/1953 | Senne |
| 2,800,330 A | 7/1957 | Pickard |
| 2,913,111 A | 11/1959 | Rogers |
| 2,942,691 A | 6/1960 | Dillon |
| 3,015,122 A | 1/1962 | Cook |
| 3,031,730 A | 5/1962 | Morin |
| 3,085,221 A | 4/1963 | Kelly |
| 3,130,157 A | 4/1964 | Kelsall et al. |
| 3,200,568 A | 8/1965 | McNeil |
| 3,310,828 A | 3/1967 | Clark |
| 3,320,727 A | 5/1967 | Farley et al. |
| 3,356,334 A | 12/1967 | Scaramucci |
| 3,457,744 A | 7/1969 | Bisbing |
| 3,530,649 A | 9/1970 | Porsch et al. |
| 3,543,325 A | 12/1970 | Hamrick |
| 3,582,616 A | 6/1971 | Wrob |
| 3,822,533 A | 7/1974 | Oranje |
| 3,898,068 A | 8/1975 | McNeil et al. |
| 3,988,132 A | 10/1976 | Oranje |
| 3,988,133 A | 10/1976 | Schady |
| 4,187,088 A | 2/1980 | Hodgson |
| 4,236,903 A | 12/1980 | Malmsten |
| 4,279,355 A | 7/1981 | Schwartz et al. |
| 4,373,228 A | 2/1983 | Dyson |
| 4,393,536 A | 7/1983 | Tapp |
| 4,443,910 A | 4/1984 | Fitzwater |
| 4,523,936 A | 6/1985 | Disanza |
| D280,033 S | 8/1985 | Miyamoto et al. |
| 4,573,236 A | 3/1986 | Dyson |
| 4,635,315 A | 1/1987 | Kozak |
| D290,894 S | 7/1987 | Miyamoto et al. |
| D298,875 S | 12/1988 | Nakamura |
| 4,809,393 A | 3/1989 | Goodrich et al. |
| 4,809,398 A | 3/1989 | Linduist et al. |
| 4,826,515 A | 5/1989 | Dyson et al. |
| 4,831,685 A | 5/1989 | Bosyj et al. |
| 4,836,515 A | 6/1989 | Franz et al. |
| D303,173 S | 8/1989 | Miyamoto et al. |
| 4,905,342 A | 3/1990 | Ataka |
| 5,035,024 A | 7/1991 | Steiner et al. |
| 5,054,157 A | 10/1991 | Werner et al. |
| 5,078,761 A | 1/1992 | Dyson |
| 5,129,125 A | 7/1992 | Akira et al. |
| 5,230,722 A | 7/1993 | Yonkers |
| 5,254,019 A | 10/1993 | Noschese |
| 5,267,371 A | 12/1993 | Soler et al. |
| 5,287,591 A | 2/1994 | Rench et al. |
| 5,307,538 A | 5/1994 | Rench et al. |
| 5,309,600 A | 5/1994 | Weaver et al. |
| 5,309,601 A | 5/1994 | Hampton et al. |
| 5,331,714 A | 7/1994 | Essex et al. |
| 5,358,290 A | 10/1994 | Fleet et al. |
| 5,363,535 A | 11/1994 | Rench et al. |
| D353,917 S | 12/1994 | Hoekstra et al. |
| 5,379,483 A | 1/1995 | Pino |
| 5,467,835 A | 11/1995 | Obermeier et al. |
| 5,524,321 A | 6/1996 | Weaver et al. |
| 5,715,566 A | 2/1998 | Weaver et al. |
| 5,815,883 A | 10/1998 | Stein et al. |
| 5,836,047 A | 11/1998 | Lee et al. |
| 5,839,157 A | 11/1998 | Strauser et al. |
| 5,842,254 A | 12/1998 | Lee |
| 5,858,038 A | 1/1999 | Dyson et al. |
| 5,974,625 A | 11/1999 | Garner |
| 6,058,559 A | 5/2000 | Yoshimi et al. |
| 6,070,291 A | 6/2000 | Bair et al. |
| 6,080,022 A | 6/2000 | Shaberman et al. |
| 6,081,961 A | 7/2000 | Wang |
| 6,098,244 A | 8/2000 | Conrad et al. |
| 6,099,661 A | 8/2000 | Conrad |
| 6,101,672 A | 8/2000 | Conrad et al. |
| 6,123,779 A | 9/2000 | Conrad et al. |
| 6,129,775 A | 10/2000 | Conrad et al. |
| 6,135,708 A | 10/2000 | Conrad et al. |
| D436,699 S | 1/2001 | Makihara et al. |
| 6,168,716 B1 | 1/2001 | Conrad et al. |
| 6,170,119 B1 | 1/2001 | Conrad et al. |
| 6,173,474 B1 | 1/2001 | Conrad |
| 6,174,127 B1 | 1/2001 | Conrad et al. |
| 6,183,641 B1 | 2/2001 | Conrad et al. |
| 6,192,550 B1 | 2/2001 | Hamada et al. |
| 6,210,469 B1 | 4/2001 | Tokar |
| 6,221,134 B1 | 4/2001 | Conrad et al. |
| 6,224,325 B1 | 5/2001 | Conrad et al. |
| 6,228,260 B1 | 5/2001 | Conrad et al. |
| 6,231,645 B1 | 5/2001 | Conrad et al. |
| 6,231,649 B1 | 5/2001 | Dyson et al. |
| 6,238,177 B1 | 5/2001 | Conrad et al. |
| 6,243,917 B1 | 6/2001 | Conrad |
| 6,251,296 B1 | 6/2001 | Conrad et al. |
| 6,256,832 B1 | 7/2001 | Dyson |
| 6,261,052 B1 | 7/2001 | Conrad et al. |
| 6,261,379 B1 | 7/2001 | Conrad et al. |
| 6,280,143 B1 | 8/2001 | Parker et al. |
| 6,295,692 B1 | 10/2001 | Shideler |
| 6,307,358 B1 | 10/2001 | Conrad |
| 6,312,594 B1 | 11/2001 | Conrad et al. |
| 6,328,527 B1 | 12/2001 | Conrad et al. |
| 6,334,234 B1 | 1/2002 | Conrad et al. |
| 6,344,064 B1 | 2/2002 | Conrad |
| 6,375,696 B2 | 4/2002 | Weglin et al. |
| 6,406,505 B1 | 6/2002 | Oh et al. |
| 6,406,605 B1 | 6/2002 | Oh et al. |
| 6,434,785 B1 | 8/2002 | Vandenbelt et al. |
| 6,440,197 B1 | 8/2002 | Conrad et al. |
| 6,457,205 B1 | 10/2002 | Conrad |
| 6,463,622 B2 | 10/2002 | Wright et al. |
| 6,482,246 B1 | 11/2002 | Dyson et al. |
| 6,482,252 B1 | 11/2002 | Conrad et al. |
| 6,502,278 B2 | 1/2003 | Oh et al. |
| 6,510,583 B2 | 1/2003 | Griffith et al. |
| 6,514,131 B1 | 2/2003 | Reich et al. |
| 6,531,066 B1 | 3/2003 | Saunders et al. |
| 6,533,834 B2 | 3/2003 | Conrad et al. |
| 6,546,592 B1 | 4/2003 | Cockburn et al. |
| 6,553,612 B1 | 4/2003 | Dyson et al. |
| 6,560,818 B1 | 5/2003 | Hasko |
| 6,581,239 B1 | 6/2003 | Dyson et al. |
| 6,596,046 B2 | 7/2003 | Conrad et al. |
| 6,599,340 B2 | 7/2003 | Conrad et al. |
| 6,613,129 B2 | 9/2003 | Gen |
| 6,623,539 B2 | 9/2003 | Lee et al. |
| 6,712,868 B2 * | 3/2004 | Murphy .................... A47L 5/36 55/482 |
| 6,736,873 B2 | 5/2004 | Conrad et al. |
| 6,740,144 B2 | 5/2004 | Conrad et al. |
| 6,746,500 B1 | 6/2004 | Park et al. |
| 6,766,558 B1 | 7/2004 | Matsumoto et al. |
| 6,782,583 B2 | 8/2004 | Oh |
| 6,782,585 B1 | 8/2004 | Conrad et al. |
| D498,027 S | 11/2004 | Alsruh et al. |
| 6,810,558 B2 | 11/2004 | Lee |
| 6,832,408 B2 | 12/2004 | Roney et al. |
| 6,833,015 B2 | 12/2004 | Oh et al. |
| 6,840,972 B1 | 1/2005 | Kim |
| 6,848,146 B2 | 2/2005 | Wright et al. |
| 6,874,197 B1 | 4/2005 | Conrad |
| 6,883,202 B2 | 4/2005 | Steffen et al. |

(56) References Cited

U.S. PATENT DOCUMENTS

| | | |
|---|---|---|
| 6,901,625 B2 | 6/2005 | Yang et al. |
| 6,902,596 B2 | 6/2005 | Conrad et al. |
| 6,929,516 B2 | 8/2005 | Bruchu et al. |
| 6,961,975 B2 | 11/2005 | Park et al. |
| 6,974,488 B2 | 12/2005 | Dyson |
| 6,976,885 B2 | 12/2005 | Lord |
| 6,991,666 B2 | 1/2006 | Organ |
| 7,028,369 B2 | 4/2006 | Park et al. |
| 7,039,985 B2 | 5/2006 | Hisrich et al. |
| 7,073,226 B1 | 7/2006 | Lenkiewicz et al. |
| 7,127,397 B2 | 10/2006 | Case |
| 7,131,165 B2 | 11/2006 | Wright et al. |
| 7,146,681 B2 | 12/2006 | Wright et al. |
| 7,160,346 B2 | 1/2007 | Park |
| 7,207,083 B2 | 4/2007 | Hayashi et al. |
| 7,222,393 B2 | 5/2007 | Kaffenberger et al. |
| 7,247,181 B2 | 7/2007 | Hansen |
| 7,278,181 B2 | 10/2007 | Harris et al. |
| 7,309,365 B2 | 12/2007 | Yuasa et al. |
| 7,329,294 B2 | 2/2008 | Conrad |
| 7,335,242 B2 | 2/2008 | Oh |
| 7,370,387 B2 | 5/2008 | Walker et al. |
| 7,377,008 B2 | 5/2008 | Park et al. |
| 7,380,308 B2 | 6/2008 | Oh et al. |
| 7,381,234 B2 | 6/2008 | Oh |
| 7,386,916 B2 | 6/2008 | Bone |
| D581,609 S | 11/2008 | Conrad |
| 7,445,655 B2 | 11/2008 | Bock et al. |
| 7,448,363 B1 | 11/2008 | Rassmussen et al. |
| 7,485,164 B2 | 2/2009 | Jeong et al. |
| 7,488,362 B2 | 2/2009 | Jeong et al. |
| D591,466 S | 4/2009 | Crawley |
| 7,526,833 B2 | 5/2009 | Cochran et al. |
| 7,540,894 B2 | 6/2009 | Ni |
| 7,544,224 B2 | 6/2009 | Tanner et al. |
| 7,547,338 B2 | 6/2009 | Kim et al. |
| 7,581,286 B2 | 9/2009 | Choi |
| 7,584,522 B1 | 9/2009 | Weeter |
| 7,594,296 B2 | 9/2009 | Park |
| 7,597,730 B2 | 10/2009 | Yoo et al. |
| 7,604,675 B2 | 10/2009 | Makarov et al. |
| 7,624,475 B2 | 12/2009 | Choi |
| 7,645,309 B2 | 1/2010 | Jeong et al. |
| 7,645,311 B2 | 1/2010 | Oh et al. |
| 7,686,858 B2 | 3/2010 | Oh |
| 7,691,161 B2 | 4/2010 | Oh et al. |
| 7,717,973 B2 | 5/2010 | Oh et al. |
| 7,722,709 B2 | 5/2010 | Conrad |
| 7,731,769 B2 | 6/2010 | Min |
| 7,740,675 B2 | 6/2010 | Conrad |
| 7,740,676 B2 | 6/2010 | Burnham et al. |
| 7,749,293 B2 | 7/2010 | Conrad |
| 7,776,120 B2 | 8/2010 | Conrad |
| 7,779,505 B2 | 8/2010 | Krebs et al. |
| 7,794,515 B2 | 9/2010 | Oh et al. |
| 7,803,207 B2 | 9/2010 | Conrad |
| 7,811,345 B2 | 10/2010 | Conrad |
| 7,845,046 B2 | 12/2010 | Milligan et al. |
| 7,867,308 B2 | 1/2011 | Conrad |
| 7,882,592 B2 | 2/2011 | Hwang et al. |
| 7,882,593 B2 | 2/2011 | Beskow et al. |
| 7,887,612 B2 | 2/2011 | Conrad |
| D635,728 S | 4/2011 | Fjellman |
| 7,922,794 B2 | 4/2011 | Morphey |
| 7,931,716 B2 | 4/2011 | Oakham |
| 7,934,286 B2 | 5/2011 | Yoo et al. |
| 7,941,895 B2 | 5/2011 | Conrad |
| 7,958,598 B2 | 6/2011 | Yun et al. |
| 7,979,953 B2 | 7/2011 | Yoo |
| 7,996,956 B2 | 8/2011 | Wood et al. |
| 8,015,659 B2 | 9/2011 | Conrad et al. |
| 8,016,902 B2 | 9/2011 | Makarov |
| 8,032,981 B2 | 10/2011 | Yoo |
| 8,032,983 B2 | 10/2011 | Griffith et al. |
| 8,048,180 B2 | 11/2011 | Oh et al. |
| 8,062,398 B2 | 11/2011 | Luo et al. |
| 8,100,999 B2 | 1/2012 | Ashbee et al. |
| 8,101,001 B2 | 1/2012 | Qian |
| 8,117,712 B2 | 2/2012 | Dyson et al. |
| 8,117,713 B2 | 2/2012 | Kasper et al. |
| 8,127,397 B2 | 3/2012 | Hess et al. |
| 8,127,398 B2 | 3/2012 | Conrad |
| 8,146,201 B2 | 4/2012 | Conrad |
| 8,151,407 B2 | 4/2012 | Conrad |
| 8,156,609 B2 | 4/2012 | Milne et al. |
| 8,176,596 B2 | 5/2012 | Conrad |
| 8,191,203 B2 | 6/2012 | Yoo |
| 8,192,515 B2 | 6/2012 | Conrad |
| 8,220,109 B2 | 7/2012 | Medema |
| 8,236,077 B2 | 8/2012 | Gomicaiaga-Pereda et al. |
| 8,282,697 B2 | 10/2012 | Oh |
| 8,292,979 B2 | 10/2012 | Conrad |
| 8,302,250 B2 | 11/2012 | Dyson et al. |
| 8,347,455 B2 | 1/2013 | Dyson et al. |
| 8,349,428 B2 | 1/2013 | Conrad |
| 8,359,705 B2 | 1/2013 | Conrad |
| 8,387,204 B2 | 3/2013 | Dyson |
| 8,424,154 B2 | 4/2013 | Beskow et al. |
| 8,444,731 B2 | 5/2013 | Gomiciaga-Pereda et al. |
| 8,468,646 B2 | 6/2013 | Yoo |
| 8,484,799 B2 | 7/2013 | Conrad |
| 8,528,160 B2 | 9/2013 | Conrad |
| 8,590,102 B2 | 11/2013 | Conrad |
| 8,621,709 B2 | 1/2014 | Conrad |
| 8,677,558 B2 | 3/2014 | Conrad |
| 8,707,513 B2 | 4/2014 | Ivarsson et al. |
| 8,713,751 B2 | 5/2014 | Conrad |
| 8,769,767 B2 | 7/2014 | Conrad |
| 8,869,344 B2 | 10/2014 | Conrad |
| 9,119,513 B2 | 9/2015 | Conrad |
| 10,165,912 B2 | 1/2019 | Conrad |
| 11,793,374 B2 | 10/2023 | Conrad |
| 11,857,142 B2 | 1/2024 | Conrad |
| 2001/0023517 A1 | 9/2001 | Onishi et al. |
| 2001/0027587 A1 | 10/2001 | Conrad et al. |
| 2002/0011053 A1 | 1/2002 | Oh |
| 2002/0062531 A1 | 5/2002 | Oh |
| 2002/0112315 A1 | 8/2002 | Conrad |
| 2002/0134059 A1 | 9/2002 | Oh |
| 2002/0134238 A1 | 9/2002 | Conrad et al. |
| 2002/0162188 A1 | 11/2002 | Harmen |
| 2002/0178535 A1 | 12/2002 | Oh et al. |
| 2002/0178698 A1 | 12/2002 | Oh et al. |
| 2002/0178699 A1 | 12/2002 | Oh |
| 2003/0028994 A1 | 2/2003 | Kitamura et al. |
| 2003/0037403 A1 | 2/2003 | Lang |
| 2003/0066273 A1 | 4/2003 | Choi et al. |
| 2003/0158238 A1 | 8/2003 | Hale et al. |
| 2003/0159411 A1 | 8/2003 | Hansen et al. |
| 2003/0201754 A1 | 10/2003 | Conrad |
| 2004/0010885 A1 | 1/2004 | Hitzelberger et al. |
| 2004/0020005 A1 | 2/2004 | Odachi et al. |
| 2004/0025285 A1 | 2/2004 | McCormick et al. |
| 2004/0078921 A1 | 4/2004 | Yuasa et al. |
| 2004/0163201 A1 | 8/2004 | Murphy et al. |
| 2004/0194249 A1 | 10/2004 | Lee et al. |
| 2004/0216263 A1 | 11/2004 | Best |
| 2004/0216264 A1 | 11/2004 | Shaver et al. |
| 2004/0216266 A1 | 11/2004 | Conrad |
| 2005/0081321 A1 | 4/2005 | Milligan et al. |
| 2005/0102982 A1 | 5/2005 | Dimmelow et al. |
| 2005/0138757 A1 | 6/2005 | Lee |
| 2005/0138763 A1 | 6/2005 | Tanner et al. |
| 2005/0144754 A1 | 7/2005 | Ivarsson et al. |
| 2005/0198769 A1 | 9/2005 | Lee et al. |
| 2005/0252179 A1 | 11/2005 | Oh et al. |
| 2006/0005346 A1 | 1/2006 | Rupp et al. |
| 2006/0037172 A1 | 2/2006 | Choi |
| 2006/0042206 A1 | 3/2006 | Arnold et al. |
| 2006/0075598 A1 | 4/2006 | Follegot et al. |
| 2006/0080947 A1 | 4/2006 | Lee et al. |
| 2006/0090290 A1* | 5/2006 | Lau .................. A47L 5/24 15/344 |
| 2006/0123590 A1 | 6/2006 | Fester et al. |

(56) References Cited

U.S. PATENT DOCUMENTS

| | | |
|---|---|---|
| 2006/0130448 A1 | 6/2006 | Han et al. |
| 2006/0137304 A1 | 6/2006 | Jeong et al. |
| 2006/0137305 A1 | 6/2006 | Jung |
| 2006/0137306 A1 | 6/2006 | Jeong et al. |
| 2006/0137307 A1 | 6/2006 | Jeong et al. |
| 2006/0137309 A1 | 6/2006 | Jeong et al. |
| 2006/0137314 A1 | 6/2006 | Conrad et al. |
| 2006/0156508 A1 | 7/2006 | Khalil |
| 2006/0156509 A1 | 7/2006 | Luebbering et al. |
| 2006/0156699 A1 | 7/2006 | Kim |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0196004 A1 | 9/2006 | Conrad |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230724 A1 | 10/2006 | Han et al. |
| 2006/0230726 A1 | 10/2006 | Oh et al. |
| 2006/0236663 A1 | 10/2006 | Oh |
| 2006/0248678 A1 | 11/2006 | Park |
| 2006/0254226 A1 | 11/2006 | Jeon |
| 2006/0278081 A1 | 12/2006 | Han et al. |
| 2007/0012002 A1 | 1/2007 | Oh et al. |
| 2007/0012003 A1 | 1/2007 | Oh et al. |
| 2007/0033765 A1 | 2/2007 | Walker et al. |
| 2007/0039120 A1 | 2/2007 | Choi |
| 2007/0067943 A1 | 3/2007 | Makarov |
| 2007/0067944 A1 | 3/2007 | Kitamura |
| 2007/0067945 A1 | 3/2007 | Kasper et al. |
| 2007/0077810 A1 | 4/2007 | Gogel et al. |
| 2007/0079473 A1 | 4/2007 | Min et al. |
| 2007/0079584 A1 | 4/2007 | Kim |
| 2007/0079585 A1 | 4/2007 | Oh et al. |
| 2007/0079587 A1 | 4/2007 | Kim |
| 2007/0079590 A1 | 4/2007 | Yoo |
| 2007/0084160 A1 | 4/2007 | Kim |
| 2007/0084161 A1 | 4/2007 | Yoo |
| 2007/0095028 A1 | 5/2007 | Kim |
| 2007/0095029 A1 | 5/2007 | Min |
| 2007/0095030 A1 | 5/2007 | Oh |
| 2007/0095034 A1 | 5/2007 | Han et al. |
| 2007/0143953 A1 | 6/2007 | Hwang et al. |
| 2007/0163075 A1 | 7/2007 | Butler et al. |
| 2007/0209338 A1 | 9/2007 | Conrad |
| 2007/0209519 A1 | 9/2007 | Conrad |
| 2007/0226947 A1 | 10/2007 | Kang |
| 2007/0240275 A1 | 10/2007 | Willenburg |
| 2007/0246579 A1 | 10/2007 | Blateri |
| 2007/0251048 A1 | 11/2007 | Choi |
| 2007/0271724 A1 | 11/2007 | Hakan et al. |
| 2007/0289085 A1 | 12/2007 | Yoo |
| 2007/0289264 A1 | 12/2007 | Oh |
| 2007/0289266 A1 | 12/2007 | Oh |
| 2008/0040883 A1 | 2/2008 | Beskow et al. |
| 2008/0047091 A1 | 2/2008 | Nguyen |
| 2008/0052872 A1 | 3/2008 | Cho |
| 2008/0083085 A1 | 4/2008 | Genn |
| 2008/0104793 A1 | 5/2008 | Kang et al. |
| 2008/0109972 A1 | 5/2008 | Mah et al. |
| 2008/0115312 A1 | 5/2008 | DiPasquale et al. |
| 2008/0134460 A1 | 6/2008 | Conrad |
| 2008/0134462 A1 | 6/2008 | Jansen et al. |
| 2008/0172821 A1 | 7/2008 | Kang et al. |
| 2008/0172992 A1 | 7/2008 | Conrad |
| 2008/0172995 A1 | 7/2008 | Conrad |
| 2008/0178416 A1 | 7/2008 | Conrad |
| 2008/0178418 A1 | 7/2008 | Conrad |
| 2008/0178420 A1 | 7/2008 | Conrad |
| 2008/0179133 A1 | 7/2008 | Conrad |
| 2008/0184893 A1 | 8/2008 | Oh |
| 2008/0190080 A1 | 8/2008 | Oh et al. |
| 2008/0196194 A1 | 8/2008 | Conrad |
| 2008/0196195 A1 | 8/2008 | Conrad |
| 2008/0196366 A1 | 8/2008 | Conrad |
| 2008/0209666 A1 | 9/2008 | Conrad |
| 2008/0216281 A1 | 9/2008 | Conrad |
| 2008/0216282 A1* | 9/2008 | Conrad ............... A47L 5/24 15/352 |
| 2008/0244858 A1 | 10/2008 | Shaver et al. |
| 2008/0250601 A1 | 10/2008 | Coburn |
| 2008/0256744 A1 | 10/2008 | Rowntreer et al. |
| 2009/0000054 A1 | 1/2009 | Hampton et al. |
| 2009/0031522 A1 | 2/2009 | Yoo |
| 2009/0044371 A1 | 2/2009 | Yoo et al. |
| 2009/0056290 A1 | 3/2009 | Oh et al. |
| 2009/0106932 A1 | 4/2009 | Courtney |
| 2009/0113659 A1 | 5/2009 | Jeon et al. |
| 2009/0144929 A1 | 6/2009 | Yoo |
| 2009/0144932 A1 | 6/2009 | Yoo |
| 2009/0165239 A1 | 7/2009 | Frantzen et al. |
| 2009/0165242 A1 | 7/2009 | Lee et al. |
| 2009/0205160 A1 | 8/2009 | Conrad |
| 2009/0205161 A1 | 8/2009 | Conrad |
| 2009/0229070 A1 | 9/2009 | Medema et al. |
| 2009/0241284 A1 | 10/2009 | Mayes |
| 2009/0265877 A1 | 10/2009 | Dyson et al. |
| 2009/0265883 A1 | 10/2009 | Reed et al. |
| 2009/0282639 A1 | 11/2009 | Dyson et al. |
| 2009/0289089 A1 | 11/2009 | Fullerton |
| 2009/0300873 A1 | 12/2009 | Grey |
| 2009/0307864 A1 | 12/2009 | Dyson |
| 2009/0313958 A1 | 12/2009 | Gomicaiaga-Pereda et al. |
| 2010/0005611 A1 | 1/2010 | Hong et al. |
| 2010/0043170 A1 | 2/2010 | Zugen |
| 2010/0045215 A1 | 2/2010 | Hawker et al. |
| 2010/0071153 A1 | 3/2010 | Genn |
| 2010/0083459 A1 | 4/2010 | Beskow |
| 2010/0095476 A1 | 4/2010 | Kim et al. |
| 2010/0154150 A1 | 6/2010 | Mcleod |
| 2010/0162515 A1 | 7/2010 | Stephens |
| 2010/0175217 A1 | 7/2010 | Conrad |
| 2010/0175219 A1 | 7/2010 | Soen et al. |
| 2010/0186189 A1 | 7/2010 | Ruben |
| 2010/0224073 A1 | 9/2010 | Oh et al. |
| 2010/0229322 A1 | 9/2010 | Conrad |
| 2010/0229336 A1 | 9/2010 | Conrad |
| 2010/0229338 A1 | 9/2010 | Conrad |
| 2010/0242222 A1 | 9/2010 | Conrad |
| 2010/0242421 A1 | 9/2010 | Conrad et al. |
| 2010/0293745 A1 | 11/2010 | Coburn |
| 2011/0023262 A1 | 2/2011 | Conrad |
| 2011/0219566 A1 | 9/2011 | Dyson et al. |
| 2011/0219571 A1 | 9/2011 | Dyson et al. |
| 2011/0219573 A1 | 9/2011 | Conrad |
| 2011/0314629 A1 | 12/2011 | Conrad |
| 2012/0000030 A1 | 1/2012 | Conrad |
| 2012/0030895 A1 | 2/2012 | Chong et al. |
| 2012/0030896 A1 | 2/2012 | Crouch et al. |
| 2012/0079671 A1 | 4/2012 | Stickney et al. |
| 2012/0159734 A1 | 6/2012 | Jujiwara |
| 2012/0222235 A1 | 9/2012 | Lenkiewicz et al. |
| 2012/0222245 A1 | 9/2012 | Conrad |
| 2012/0272472 A1 | 11/2012 | Conrad |
| 2013/0091660 A1 | 4/2013 | Smith |
| 2013/0091661 A1 | 4/2013 | Smith |
| 2013/0091812 A1 | 4/2013 | Smith |
| 2013/0091813 A1 | 4/2013 | Smith |
| 2013/0104335 A1 | 5/2013 | Conrad |
| 2014/0237768 A1 | 8/2014 | Conrad |
| 2016/0367094 A1 | 12/2016 | Conrad |

FOREIGN PATENT DOCUMENTS

| | | |
|---|---|---|
| CA | 2275675 A1 | 12/1999 |
| CA | 2288544 A1 | 5/2000 |
| CA | 2289060 A1 | 5/2000 |
| CA | 2258392 A1 | 7/2000 |
| CA | 2258416 A1 | 7/2000 |
| CA | 2258419 A1 | 7/2000 |
| CA | 2258421 A1 | 7/2000 |
| CA | 2258422 A1 | 7/2000 |
| CA | 2258423 A1 | 7/2000 |

(56) References Cited

FOREIGN PATENT DOCUMENTS

| | | |
|---|---|---|
| CA | 2258426 A1 | 7/2000 |
| CA | 2258428 A1 | 7/2000 |
| CA | 2330801 A1 | 7/2001 |
| CA | 2412881 A1 | 12/2001 |
| CA | 2338193 A1 | 7/2002 |
| CA | 2339514 A1 | 9/2002 |
| CA | 2342673 A1 | 9/2002 |
| CA | 2342993 A1 | 9/2002 |
| CA | 2241644 C | 12/2007 |
| CA | 2675723 A1 | 6/2008 |
| CA | 2658005 A1 | 9/2010 |
| CA | 2658014 A1 | 9/2010 |
| CA | 2658381 A1 | 9/2010 |
| CA | 2658651 A1 | 9/2010 |
| CA | 2659212 A1 | 9/2010 |
| CA | 2674056 A1 | 9/2010 |
| CA | 2674761 A1 | 9/2010 |
| CA | 2678119 A1 | 9/2010 |
| CA | 2755305 A1 | 9/2010 |
| CA | 2755307 A1 | 9/2010 |
| CA | 2730689 A1 | 9/2011 |
| CA | 2574291 C | 8/2013 |
| CA | 2677530 C | 1/2014 |
| CN | 2524655 Y | 12/2002 |
| CN | 2534954 Y | 2/2003 |
| CN | 1626025 A | 6/2005 |
| CN | 1765283 A | 5/2006 |
| CN | 1806741 A | 7/2006 |
| CN | 1911151 A | 2/2007 |
| CN | 101061932 A | 10/2007 |
| CN | 101095604 A | 1/2008 |
| CN | 201101488 Y | 8/2008 |
| CN | 101288572 A | 10/2008 |
| CN | 101357051 A | 2/2009 |
| CN | 101448447 A | 6/2009 |
| CN | 101489455 A | 7/2009 |
| CN | 101489457 A | 7/2009 |
| CN | 101489461 A | 7/2009 |
| CN | 201523596 U | 7/2010 |
| CN | 101822506 A | 9/2010 |
| CN | 201683850 U | 12/2010 |
| CN | 102256523 A | 11/2011 |
| CN | 202173358 U | 3/2012 |
| CN | 101631494 B | 4/2012 |
| CN | 202699035 U | 1/2013 |
| CN | 103040412 A | 4/2013 |
| CN | 103040413 A | 4/2013 |
| CN | 103169420 A | 6/2013 |
| CN | 203724037 U | 7/2014 |
| DE | 3734355 C2 | 6/1989 |
| DE | 3743083 C2 | 8/1997 |
| DE | 202005020767 U1 | 8/2006 |
| DE | 112007003039 T5 | 10/2009 |
| DE | 112007003052 T5 | 1/2010 |
| DE | 112010001135 T5 | 8/2012 |
| EP | 0489468 A1 | 6/1992 |
| EP | 887040 A1 | 12/1998 |
| EP | 1356755 A2 | 10/2003 |
| EP | 1674009 A2 | 6/2006 |
| EP | 1938736 A2 | 7/2008 |
| EP | 1771104 B1 | 9/2008 |
| EP | 966912 B1 | 3/2010 |
| EP | 2049000 B1 | 6/2011 |
| EP | 1356755 B1 | 5/2012 |
| EP | 2201875 B1 | 4/2013 |
| EP | 1629758 B1 | 10/2013 |
| FR | 2812531 B1 | 11/2004 |
| GB | 2035787 B | 10/1982 |
| GB | 2251178 A | 7/1992 |
| GB | 2268875 A | 1/1994 |
| GB | 2365324 B1 | 7/2002 |
| GB | 2377880 A | 1/2003 |
| GB | 2409404 B | 11/2005 |
| GB | 2440109 A | 1/2008 |
| GB | 2440110 A * | 1/2008 ............... A47L 5/24 |
| GB | 2441962 A | 3/2008 |
| GB | 2466290 A | 6/2010 |
| GB | 2478614 B1 | 2/2012 |
| GB | 2458243 B | 4/2012 |
| GB | 2484146 B1 | 2/2013 |
| GB | 2478599 B | 7/2014 |
| JP | 745200 | 10/1888 |
| JP | 609203 | 9/1983 |
| JP | 745201 | 10/1983 |
| JP | 649078 | 4/1985 |
| JP | 6049084 | 4/1985 |
| JP | 60220027 A | 11/1985 |
| JP | 679295 | 5/1986 |
| JP | 679390 | 5/1986 |
| JP | 679426 | 5/1986 |
| JP | 679806 | 5/1986 |
| JP | 61131720 | 6/1986 |
| JP | 706192 | 5/1987 |
| JP | 706193 | 5/1987 |
| JP | 725983 | 2/1988 |
| JP | 726042 | 3/1988 |
| JP | 726318 | 3/1988 |
| JP | 743619 | 6/1988 |
| JP | 743059 | 9/1988 |
| JP | 743445 | 9/1988 |
| JP | 743603 | 9/1988 |
| JP | 743618 | 9/1988 |
| JP | 63246116 A | 10/1988 |
| JP | 943287 | 11/1988 |
| JP | 6415020 | 1/1989 |
| JP | 788427 | 2/1990 |
| JP | 787941 | 5/1990 |
| JP | 788426 | 5/1990 |
| JP | 8289861 A | 11/1996 |
| JP | 2000083879 | 3/2000 |
| JP | 2000140533 A1 | 5/2000 |
| JP | 1115813 | 7/2001 |
| JP | 2005040246 A1 | 2/2005 |
| JP | 2005087508 Y | 4/2005 |
| JP | 1310024 | 9/2007 |
| JP | 1370915 | 10/2009 |
| JP | 2009261501 A | 11/2009 |
| JP | 2010227287 A | 10/2010 |
| KR | 300360565 | 9/2004 |
| WO | 9619294 A1 | 6/1996 |
| WO | 0010718 A1 | 3/2000 |
| WO | 2004069021 A1 | 8/2004 |
| WO | 2005089618 A3 | 2/2006 |
| WO | 2006026414 A3 | 8/2007 |
| WO | 2007104138 A | 9/2007 |
| WO | 2007104138 A1 | 9/2007 |
| WO | 2007104238 A1 | 9/2007 |
| WO | 2008009883 A1 | 1/2008 |
| WO | 2008009887 A1 | 1/2008 |
| WO | 2008009888 A | 1/2008 |
| WO | 2008009888 A1 | 1/2008 |
| WO | 2008009890 A1 | 1/2008 |
| WO | 2007084699 A3 | 2/2008 |
| WO | 2008017802 A1 | 2/2008 |
| WO | 2008035032 A2 | 3/2008 |
| WO | 2008135708 A1 | 5/2008 |
| WO | 2008070966 A1 | 6/2008 |
| WO | 2008070980 A1 | 6/2008 |
| WO | 2009026709 A1 | 3/2009 |
| WO | 2010102396 A1 | 9/2010 |
| WO | 2010102410 A1 | 9/2010 |
| WO | 2010102411 A1 | 9/2010 |
| WO | 2011054106 A1 | 5/2011 |
| WO | 2012042240 | 4/2012 |
| WO | 2012042240 A1 | 4/2012 |

OTHER PUBLICATIONS

"Instruction Manual for Cordless Cleaner", Makita, pp. 1-32.
International Search Report received on the corresponding International Application No. PCT/CA2010/000340, dated Jun. 25, 2010.

(56) References Cited

OTHER PUBLICATIONS

What's the Best vacuum.com Forum discussion Dyson DC16 Root 6 Hand Held Vacuum Cleaner; http://www.abbysguide.com/vacuum/legacy/cgi-bin/yabb/2618-YaBB.html; dated Oct. 21, 2006.
English machine translation of FR2812531, published on Nov. 5, 2004.
English machine translation of JP788427, published on May 23, 1990.
English machine translation of JP2000140533, published on May 23, 2000.
English machine translation of JP2005040246, published on Feb. 17, 2005.
English machine translation of JP2005087508, published on Apr. 7, 2005.
English machine translation of JP2009261501, published on Nov. 12, 2009.
English machine translation of JP2010227287, published on Oct. 14, 2010.
English machine translation of the Abstract of KR30-0360565S, published on Sep. 1, 2004.
English machine translation of JP1115813, published on Jul. 16, 2001.
English machine translation of JP1370915, published on Oct. 13, 2009.
English machine translation of JP2000083879, published on Mar. 28, 2000.
English machine translation of CN2534954, published on Feb. 12, 2003.
English machine translation of CN1626025, published on Jun. 15, 2005.
English machine translation of CN1765283, published on May 3, 2006.
English machine translation of CN1806741, published on Jul. 26, 2006.
English machine translation of CN1911151, published on Feb. 14, 2007.
English machine translation of CN101061932, published on Oct. 31, 2007.
English machine translation of CN101095604, published on Jan. 2, 2008.
English machine translation of CN201101488, published on Aug. 20, 2008.
English machine translation of CN101288572, published on Oct. 22, 2008.
English machine translation of CN101357051, published on Feb. 4, 2009.
English machine translation of CN101448447, published on Jun. 3, 2009.
English machine translation of CN101489461, published on Jul. 22, 2009.
English machine translation of CN101489457, published on Jul. 22, 2009.
English machine translation of CN101489455, published on Jul. 22, 2009.
English machine translation of DE112010001135, published on Aug. 2, 2012.
English machine translation of CN101822506, published on Sep. 8, 2010.
English machine translation of CN201683850, published on Dec. 29, 2010.
English machine translation of CN102256523, published on Nov. 23, 2011.
English machine translation of CN202173358, published on Mar. 28, 2012.
English machine translation of CN101631494, puboished on Apr. 25, 2012.
English machine translation of CN202699035, published on Jan. 30, 2013.
English machine translation of CN103040413, published on Apr. 17, 2013.
English machine translation of CN103040412, published on Apr. 17, 2013.
English machine translation of CN103169420, published on Jun. 26, 2013.
English machine translation of CN203724037, published on Jul. 23, 2014.
English machine translation of DE3734355, published on Jun. 29, 1989.
English machine translation of DE3743083, published on Aug. 7, 1997.
English machine translation of JP8289861, published on Nov. 5, 1996.
English machine translation of DE112007003039, published on Oct. 29, 2009.
English machine translation of DE112007003052, published on Jan. 14, 2010.
English machine translation of CN2524655, published on Dec. 11, 2002.

* cited by examiner

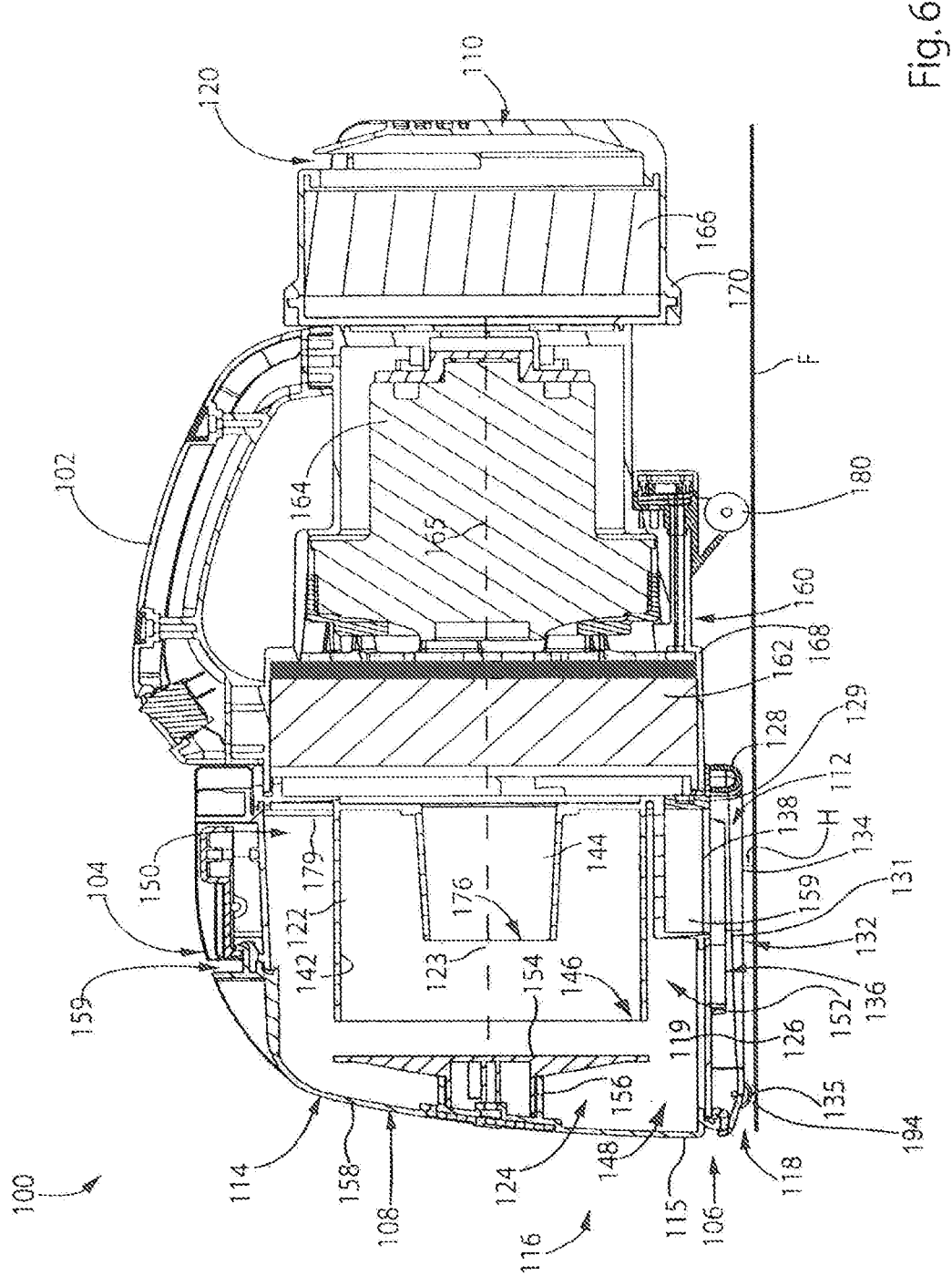

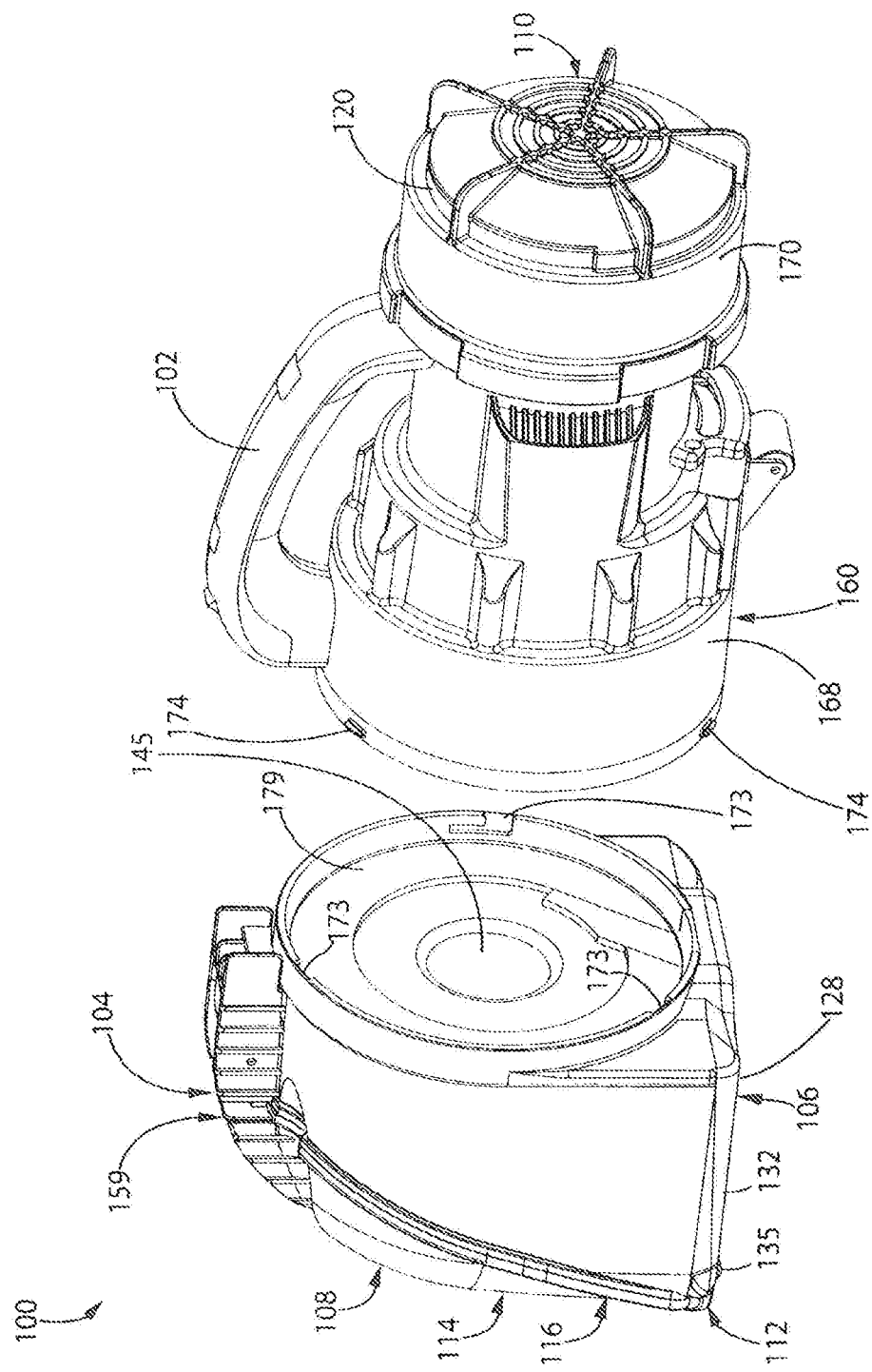

HAND VACUUM CLEANER

CROSS-REFERENCE TO RELATED APPLICATIONS

This application claims benefit under 35 USC 120 as a continuation application of co-pending U.S. patent application Ser. No. 15/015,036, which was filed on Feb. 3, 2016 and is pending, which itself is a continuation of U.S. patent application Ser. No. 13/255,858 which was filed on Sep. 9, 2011 and issued as U.S. Pat. No. 9,591,952 on Mar. 14, 2017, which was filed under 35 USC 371 as a national phase entry of international patent application No. PCT/CA2010/000340, with a filing date of Mar. 9, 2010, which itself claims the benefit of priority under 37 CFR 1.55 from Canadian patent application No. 2,658,029, filed on Mar. 11, 2009 and Canadian Patent application No. 2,658,048, filed on Mar. 11, 2009, the specifications of which are incorporated herein by reference.

FIELD

The specification relates to hand carried surface cleaning apparatus such as vacuum cleaners, and particularly, to cyclonic hand vacuum cleaners. More specifically, the specification relates to hand vacuum cleaners having a removable dirt chamber.

INTRODUCTION

The following is not an admission that anything discussed below is prior art or part of the common general knowledge of persons skilled in the art.

PCT publication WO 2008/009890 (Dyson Technology Limited) discloses a handheld cleaning appliance comprising a main body, a dirty air inlet, a clean air outlet and a cyclonic separator for separating dirt and dust from an airflow. The cyclone separator is located in an airflow path leading from the air inlet to the air outlet. The cyclonic separator is arranged in a generally upright orientation (i.e., the air rotates about a generally vertical axis in use). A base surface of the main body and a base surface of the cyclonic separator together form a base surface of the appliance for supporting the appliance on a surface. See also PCT publication WO 2008/009888 (Dyson Technology Limited) and PCT publication WO 2008/009883 (Dyson Technology Limited).

U.S. Pat. No. 7,370,387 (Black & Decker Inc.) discloses a hand-holdable vacuum cleaner that uses one or more filters and/or cyclonic separation device, and means for adjusting an angle of air inlet relative to a main axis of said vacuum cleaner. In particular, the vacuum cleaner further comprises a rigid, elongate nose having the air inlet at one end thereof, the nose being pivotal relative to a main axis of the vacuum cleaner through an angle of at least 135 degrees.

SUMMARY

The following introduction is provided to introduce the reader to the more detailed discussion to follow. The introduction is not intended to limit or define the claims.

According to one broad aspect, a hand surface cleaning apparatus is disclosed having a simplified structure for emptying the surface cleaning apparatus. The hand surface cleaning apparatus is preferably a cyclonic surface cleaning apparatus wherein the dirt chamber is removable as a sealed unit from the surface cleaning apparatus. The dirt chamber may be part of a cyclone (e.g., the lower portion of a cyclone chamber) and removable with the cyclone. Alternately, the dirt chamber may be external to the cyclone chamber and removable from the hand surface cleaning apparatus by itself. In either case, the dirt collection chamber is closed (other than, e.g., an air inlet, an air outlet, a dirt outlet) when removed from the hand surface cleaning apparatus. The dirt chamber may be openable, such as by an openable or removable lid or door. Accordingly, dirt collected in the chamber may be transported to a disposal site (e.g., a garbage can) without the dirt being dispersed as the dirt collection chamber is conveyed to the disposal site.

Another advantage of this design is that the dirt chamber, and the cyclone if removed with the dirt chamber, may be washed or immersed in water without concern that the motor of the hand surface cleaning apparatus may be damaged. The portion of the hand surface cleaning apparatus may be dried and then remounted to the hand surface cleaning apparatus so that the hand surface cleaning apparatus is then ready for further use.

In some examples, the hand surface cleaning apparatus may comprise an air flow passage extending from a dirty air inlet to a clean air outlet with a first cyclone unit positioned in the air flow passage. The first cyclone unit may comprise at least one cyclone and at least one dirt collection chamber. The dirt collection chamber may be a portion of the cyclone casing (e.g., a lower portion of a cyclone chamber or a chamber external to the cyclone casing and connected in flow communication with the cyclone chamber via a dirt outlet of the cyclone chamber. The dirt collection chamber is removable from the surface cleaning apparatus as a sealed unit for emptying. A suction motor is positioned in the air flow passage.

In some examples, the dirt collection chamber is removable from the hand surface cleaning apparatus with the first cyclone unit. The first cyclone unit may be sealed when removed from the hand surface cleaning apparatus other than fluid flow passages leading to and from the first cyclone unit.

In some examples, the first cyclone unit has a single cyclone and the dirt collection chamber is positioned exterior to the single cyclone. The cyclone and the dirt collection chamber may comprise a one-piece assembly, and may be integrally formed. For example, the dirt chamber and the cyclone chamber may be produced in a single mold, together optionally with an end wall. The other end, e.g., the bottom of the dirt chamber, may be closed by an openable door.

In some examples, the hand surface cleaning apparatus comprises a suction motor housing, the suction motor is positioned in the suction motor housing, and the first cyclone unit is removably mounted to the suction motor housing.

In some examples, the cyclone unit has a first mounting member, the suction motor housing has a second mounting member, and the first and second mounting members are rotationally secured together. Preferably, a bayonet mount is used. However, a screw mount or other means, such as latches or other hand operable releasable mechanical fasteners, may be used.

In some examples, the at least one dirt collection chamber is openable when mounted to the hand surface cleaning apparatus.

In some examples, the hand surface cleaning apparatus has a front end and a rear end, the first cyclone unit is positioned forward of the suction motor housing, and the at least one dirt collection chamber has an openable door positioned at the front end.

In some examples, the hand surface cleaning apparatus further comprises an airflow chamber extending from a dirty air inlet to the cyclone wherein the airflow chamber is removable with the first cyclone unit. The airflow chamber may be integrally formed as part of the first cyclone unit.

In some examples, the first cyclone unit has a single cyclone and a single dirt collection chamber. In other examples, the hand surface cleaning apparatus further comprises a second cyclone unit downstream from the first cyclone unit.

According to another broad aspect, a hand surface cleaning apparatus is disclosed that is easier to clean and has a simplified structure. In accordance with this aspect, a hand surface cleaning apparatus is provided with a dirt collection chamber and a nozzle. The nozzle and the dirt collection chamber may be integrally molded together or separately manufactured and then assembled together as a one-piece assembly. In either embodiment, the nozzle and the dirt collection chamber may then be removed concurrently (e.g., in a single operation) from the hand surface cleaning apparatus. Once removed, the dirt collection chamber may be emptied. During operation, dirt may build up in the nozzle of the surface cleaning apparatus and/or the dirt collection chamber. These components once separated from the hand surface cleaning apparatus may be cleaned by, for example, washing them in water.

In a preferred embodiment, the dirt collection chamber is removable in a sealed configuration. For example, a cyclone unit may comprise a cyclone and a dirt collection chamber assembly. The assembly may be removably mounted to the hand surface cleaning apparatus. Accordingly, the dirt collection chamber may be closed (e.g., have a closed lid) when removed from the hand surface cleaning apparatus.

A further advantage of this design is that the hand surface cleaning apparatus may have a simplified structure. By providing the nozzle as part of the dirt collection chamber, and preferably as part of a cyclone unit, such an assembly may be removably mounted to a motor housing. Accordingly, a skeleton or backbone to which individual components are mounted is not required and is preferably not used. Such a design may be lighter, permitting a user to use the hand surface cleaning apparatus for a longer continuous period of time.

Accordingly, for example, the hand surface cleaning apparatus may comprise an air flow passage extending from a nozzle having a dirty air inlet to a clean air outlet, with a first cyclone unit is positioned in the air flow passage. The first cyclone unit may comprise at least one cyclone having a cyclone inlet and at least one dirt collection chamber. A suction motor may be positioned in the air flow passage. The dirt collection chamber and the nozzle are removable from the surface cleaning apparatus, preferably concurrently (i.e., by the same operation step).

In some examples, the dirt collection chamber and the nozzle are removable as a unit.

In some examples, the dirt collection chamber and the nozzle comprise a one-piece assembly.

In some examples, the dirt collection chamber and the nozzle are integrally formed, such as being produced from a single mold.

In some examples, the dirt collection chamber is removable from the hand surface cleaning apparatus with the first cyclone unit.

In some examples, the nozzle is connected in airflow communication with the cyclone at a lower portion of the hand surface cleaning apparatus.

In some examples, the nozzle is positioned at a bottom of the hand vacuum.

In some examples, the nozzle is positioned beneath at least a portion of the cyclone unit.

In some examples, the hand surface cleaning apparatus further comprises a plurality of wheels, and the nozzle has a nozzle axis that extends generally horizontally when the wheels are in contact with a surface to be cleaned.

In some examples, the nozzle comprises an enclosed airflow chamber.

In some examples, the nozzle comprises an open sided airflow chamber.

In some examples, the open sided airflow chamber has an open lower end.

In some examples, the open sided airflow chamber has an upper nozzle wall that comprises at least a portion of the lower wall of the cyclone unit.

In some examples, the cyclone inlet is in communication with an enclosed passage extending from an opening in the upper nozzle wall.

In some examples, the open sided airflow chamber further comprises a depending wall extending downwardly from the upper nozzle wall.

In some examples, the depending wall is generally U-shaped.

In some examples, the hand surface cleaning apparatus has a front and the open sided airflow chamber extends to the front of the hand surface cleaning apparatus and the dirty air inlet is at the front of the hand surface cleaning apparatus.

In some examples, the cyclone inlet faces a surface to be cleaned.

In some examples, the open sided airflow chamber comprises an upper wall. A depending wall may extend downwardly from the upper wall. The depending wall may have a lower end that is positioned above the lower end of the wheels. The upper wall and the depending wall may define an airflow chamber having an open lower end. The opening may be provided in a rear half of the upper wall of the air flow chamber forwardly of a rear portion of the depending wall and inwardly of side portions of the depending wall.

It will be appreciated that a hand surface cleaning apparatus may incorporate one or more of the features of each of these examples and that each of these is within the scope of the invention, including the openable front door, the removable screen, the door being at the front of the hand surface cleaning apparatus, the open sided nozzle.

DRAWINGS

In the detailed description, reference will be made to the following drawings, in which:

FIG. 6 is a cross section taken along line 6-6 in FIG. 2; and

FIG. 7B is a rear perspective view of the hand-vacuum cleaner of FIG. 1, showing the cyclone unit removed from the hand vacuum cleaner; and, FIG. 8 is a cross section showing an alternate example of a hand vacuum cleaner.

DESCRIPTION OF VARIOUS EXAMPLES

Figure 1:
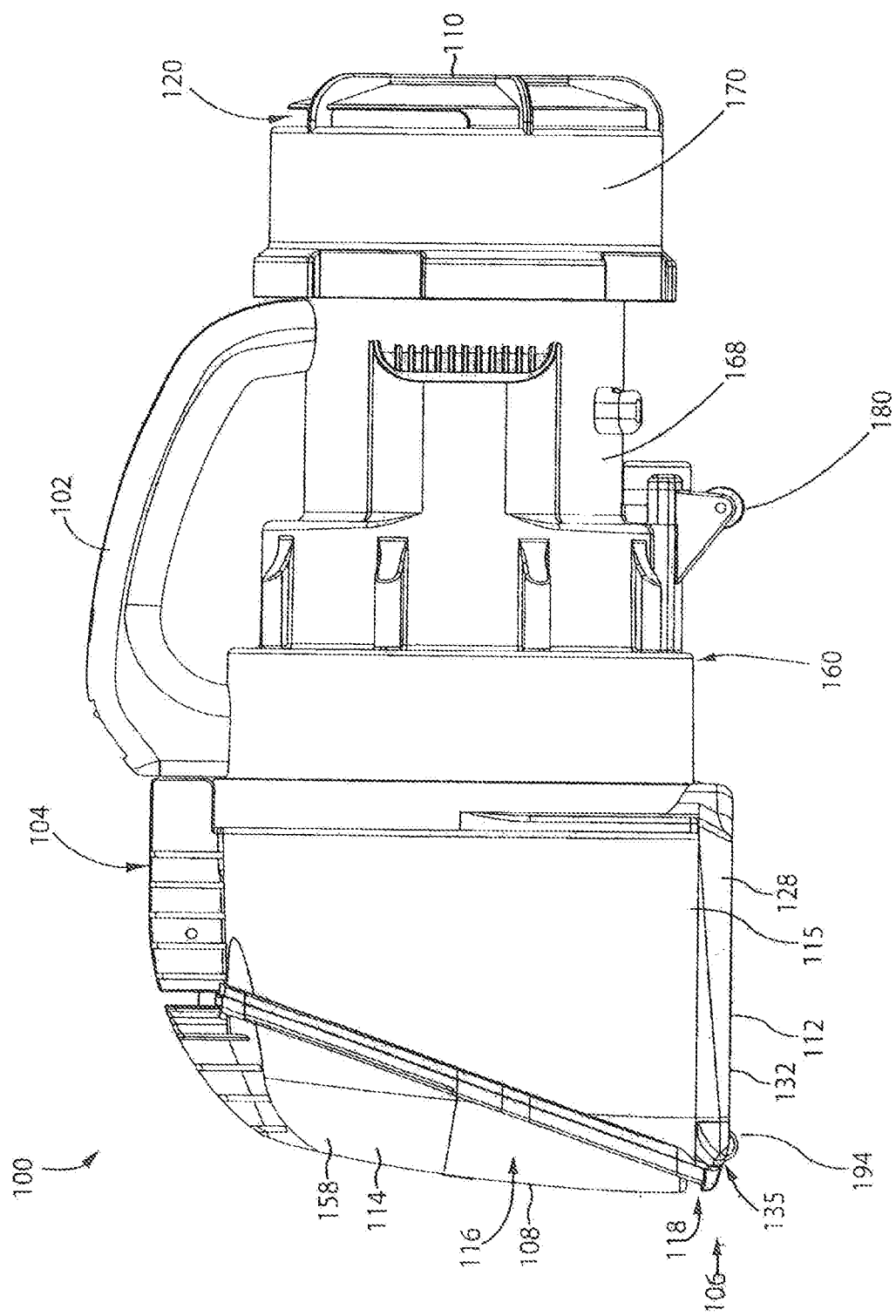
FIG. 1 is a side plan view of an example of a hand vacuum cleaner.
Figure 2:
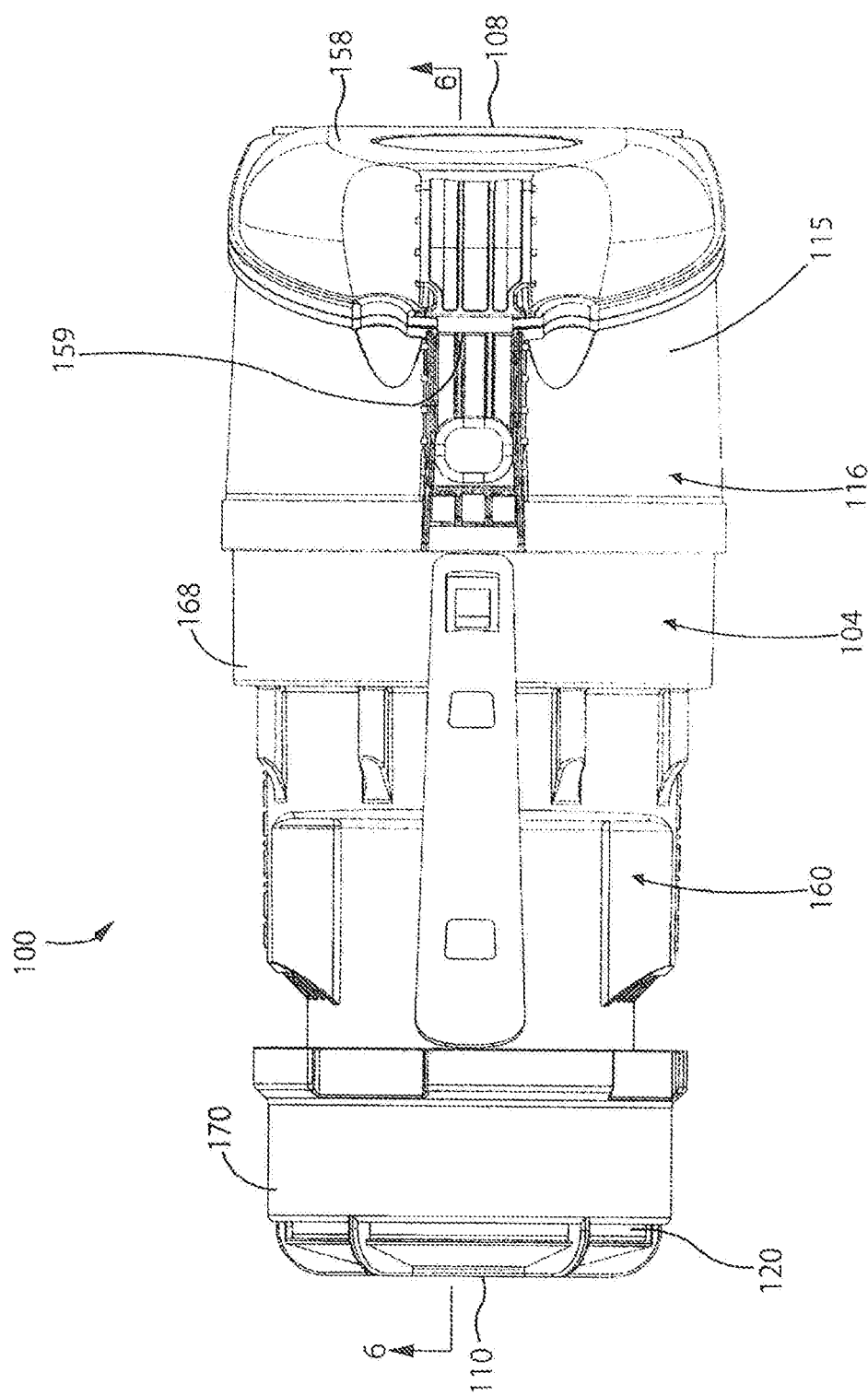
FIG. 2 is a top plan view of the hand vacuum cleaner of FIG. 1.

Various apparatuses or methods will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below.

In the drawings attached hereto, the surface cleaning apparatus is exemplified as used in a hand vacuum cleaner that uses a single cyclone axially aligned with a longitudinal axis of the hand vacuum cleaner. It will be appreciated that the vacuum cleaner 100 may be of various configurations (e.g., different positioning and orientation of the cyclone unit and the suction motor and differing cyclone units that may comprise one or more cyclones and one or more filters) and different types of surface cleaning apparatus, such as a wet/dry hand held surface cleaning apparatus.

Referring to FIGS. 1 to 7B, a first example of a vacuum cleaner 100 is shown. The vacuum cleaner 100 is a hand vacuum cleaner, and is movable along a surface to be cleaned by gripping and maneuvering handle 102. The vacuum cleaner includes an upper portion 104, a lower portion 106, a front 108, and a rear 110. In the example shown, handle 102 is provided at the upper portion 104. In alternate examples, handle 102 may be provided elsewhere on the vacuum cleaner 100, for example at the rear 110 and may be of any design.

In the example shown, the vacuum cleaner 100 comprises a nozzle 112 and a cyclone unit 114, which, in one embodiment, together form a surface cleaning head 116 of the vacuum cleaner 100. In the example shown, the surface cleaning head 116 is preferably provided at the front 108 of the vacuum cleaner 100.

Nozzle 112 engages a surface to be cleaned, and comprises a dirty air inlet 118, through which dirty air is drawn into the vacuum cleaner 100. An airflow passage extends from the dirty air inlet 118 to a clean air outlet 120 of the cleaner 100. In the example shown, clean air outlet 120 is preferably at the rear 110 of the cleaner 100.

Cyclone unit 114 is provided in the airflow passage, downstream of the dirty air inlet 118. In the example shown, the cyclone unit 114 is a one piece assembly comprising one cyclone 122, and one dirt collection chamber 124, which are preferably integrally formed. In alternate examples, the cyclone unit 110 may include more than one cyclonic stage, wherein each cyclonic stage comprising one or more cyclones and one or more dirt chambers. Accordingly, the cyclones may be arranged in parallel and/or in sequence. Further, in alternate examples, the cyclone 122 and dirt collection chamber 124 may be separately formed.

In the example shown, the nozzle 112 is positioned at the lower portion 106 of the vacuum cleaner 100. Preferably, as exemplified, nozzle 112 is positioned at the bottom of the vacuum cleaner 100, and, preferably, beneath the cyclone unit 114. Further, as exemplified, the nozzle 112 may be integral formed as port of cyclone unit 114 or may be a one-piece assembly therewith (e.g., separately manufactured but assembled together such as by an adhesive or welding to form a single component). Alternately, or in addition, it will be appreciated that nozzle 112 may be connected to the cyclone unit or dirt collection chamber at alternate locations.

Preferably, as exemplified, nozzle 112 may be on lower surface 157 of cyclone unit 114 and may share a wall with the cyclone unit 114. For example, in a particularly preferred design, the upper wall of the nozzle may be a lower wall of the cyclone unit 114. As shown in FIG. 6, dirt chamber 124 surrounds the lower portion of cyclone 122. Accordingly, the upper wall of nozzle 112 may be part of the lower wall of the dirt chamber. It will be appreciated that if dirt chamber 124 does not extend around the lower portion of cyclone 122, then the upper wall of nozzle 112 may be part of a lower wall of cyclone 122. In alternate embodiments, nozzle 112 and cyclone 122 or dirt chamber 124 need not have a common wall.

Preferably, in the example shown, the nozzle 112 is fixedly positioned at the lower portion 106 of the vacuum cleaner 100. That is, the nozzle 112 is not movable (e.g., rotatable) with respect to the remainder of the vacuum cleaner 100, and is fixed at the lower portion 106 of the vacuum cleaner 100.

Figure 3:
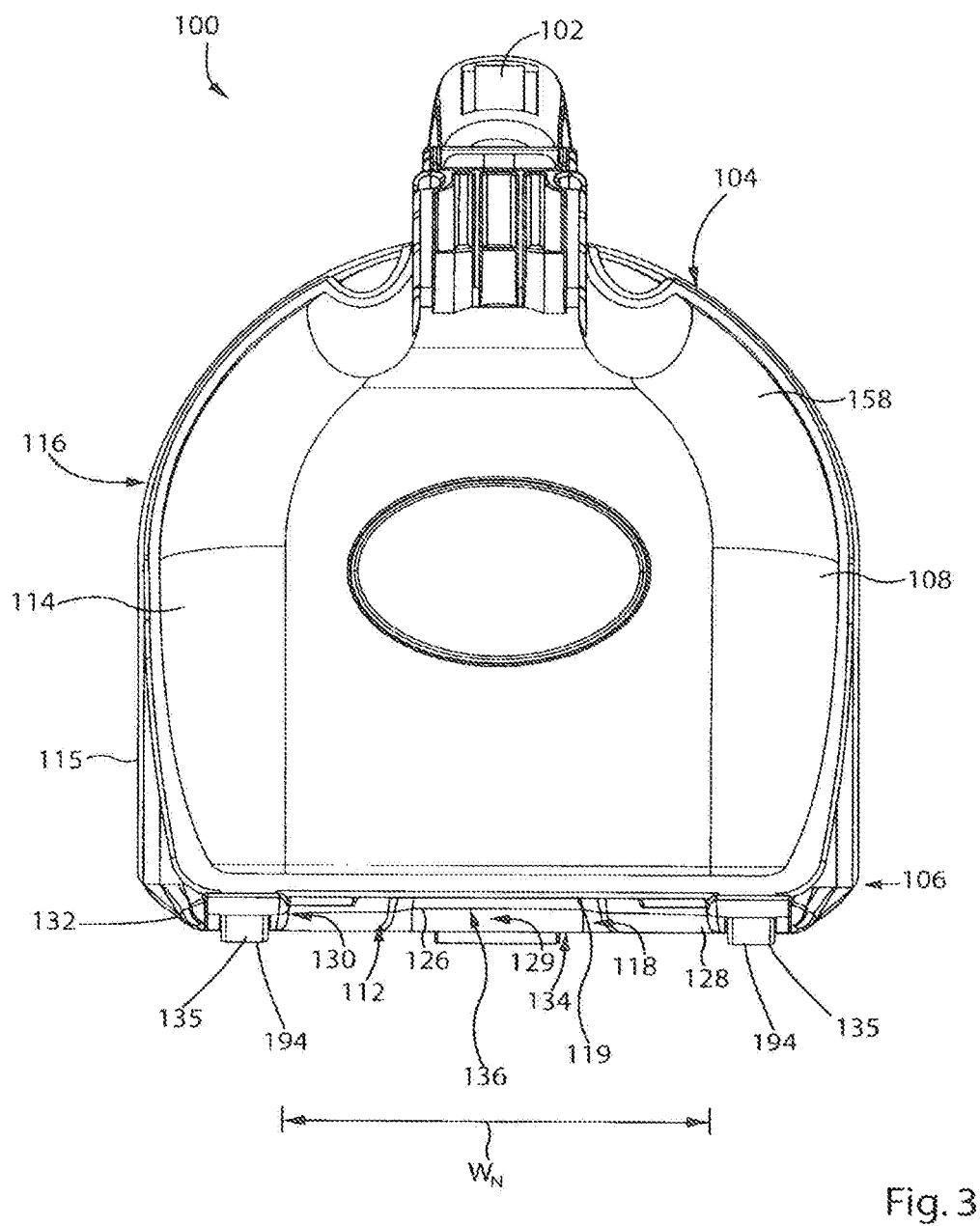
FIG. 3 is a front plan view of the hand vacuum cleaner of FIG. 1.
Figure 5:
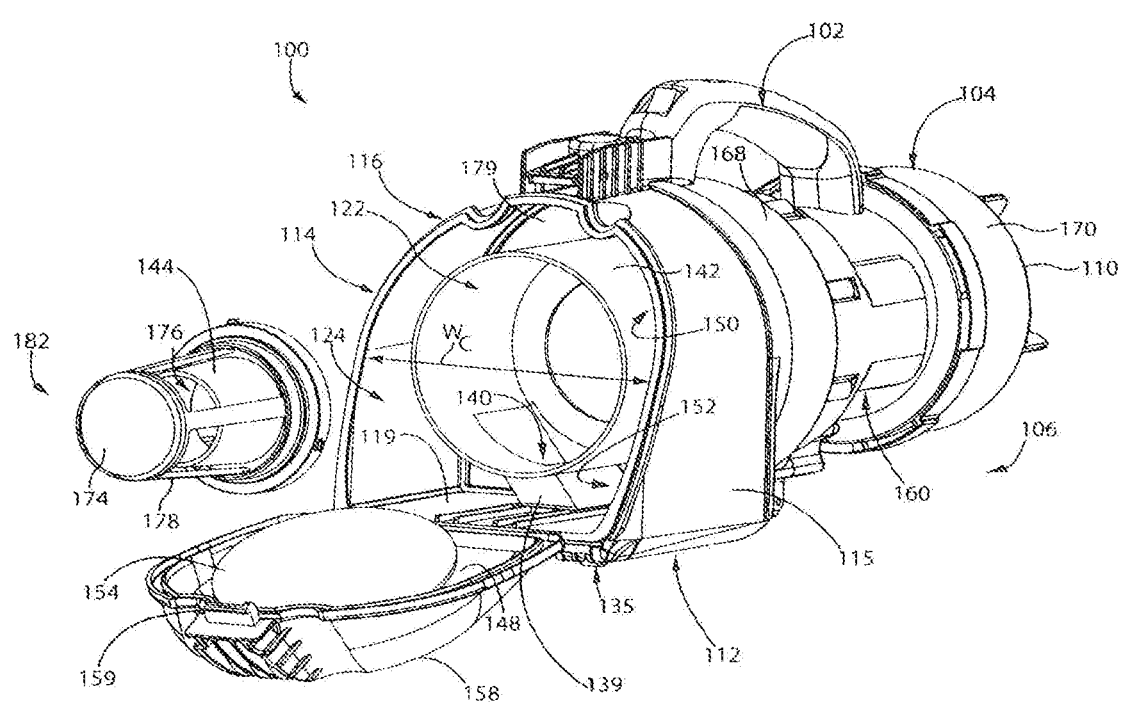
FIG. 5 is a partially exploded front perspective view of the hand vacuum cleaner of FIG. 1.
Figure 7A:
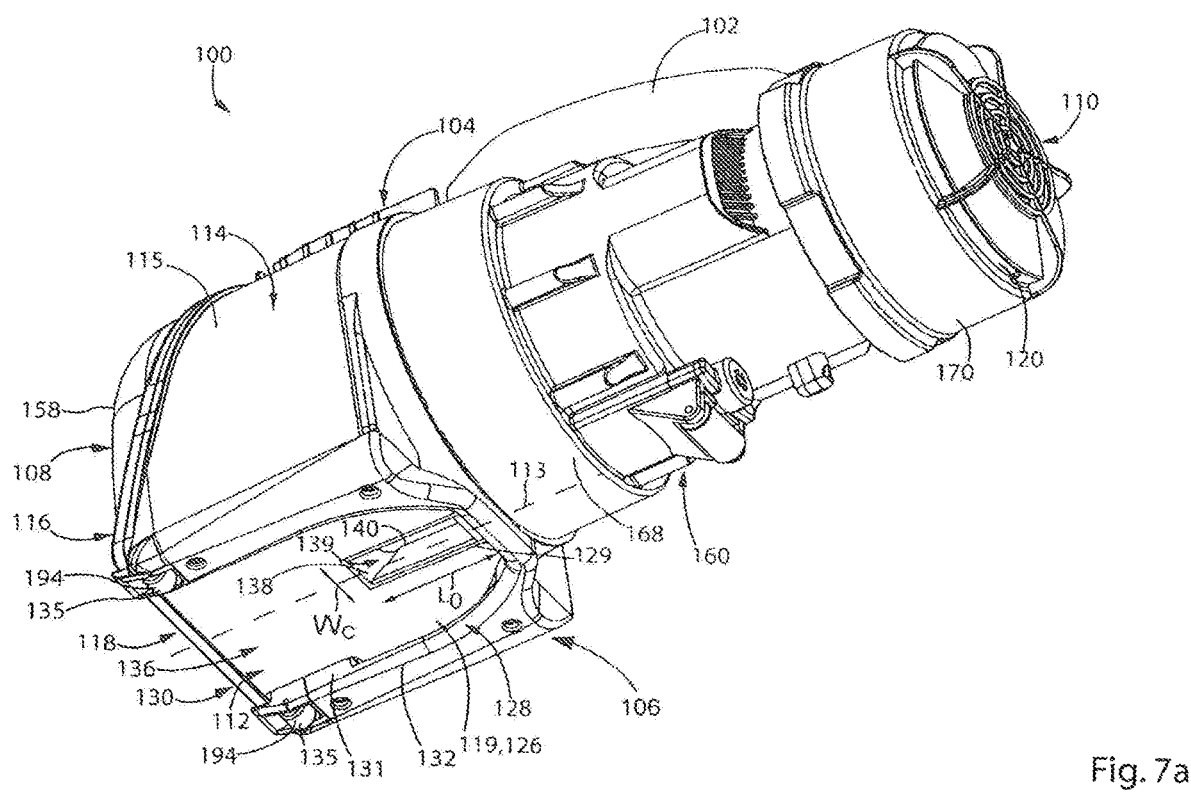
FIG. 7A is a bottom perspective view of the hand vacuum cleaner of FIG. 1.

As shown in FIGS. 3 and 5, nozzle 112 has a width $W_N$, and cyclone unit 114 has a width $W_C$. In the example shown, $W_N$, and $W_C$ are about the same. An advantage of this design is that the nozzle 112 may have a cleaning path that is essentially as wide as the hand vacuum itself.

Preferably, nozzle 112 comprises an airflow chamber 136 wherein at least a portion, and preferably a majority, of the lower surface of the chamber is open (i.e. nozzle 112 is preferably an open sided passage). Such a design is exemplified in FIG. 7A wherein nozzle 112 comprises an upper nozzle wall 126. In the example shown, the upper nozzle wall 126 comprises a portion 119 of a wall 115 of the cyclone unit. Accordingly, nozzle 112 is integral with cyclone unit 114.

Figure 8:
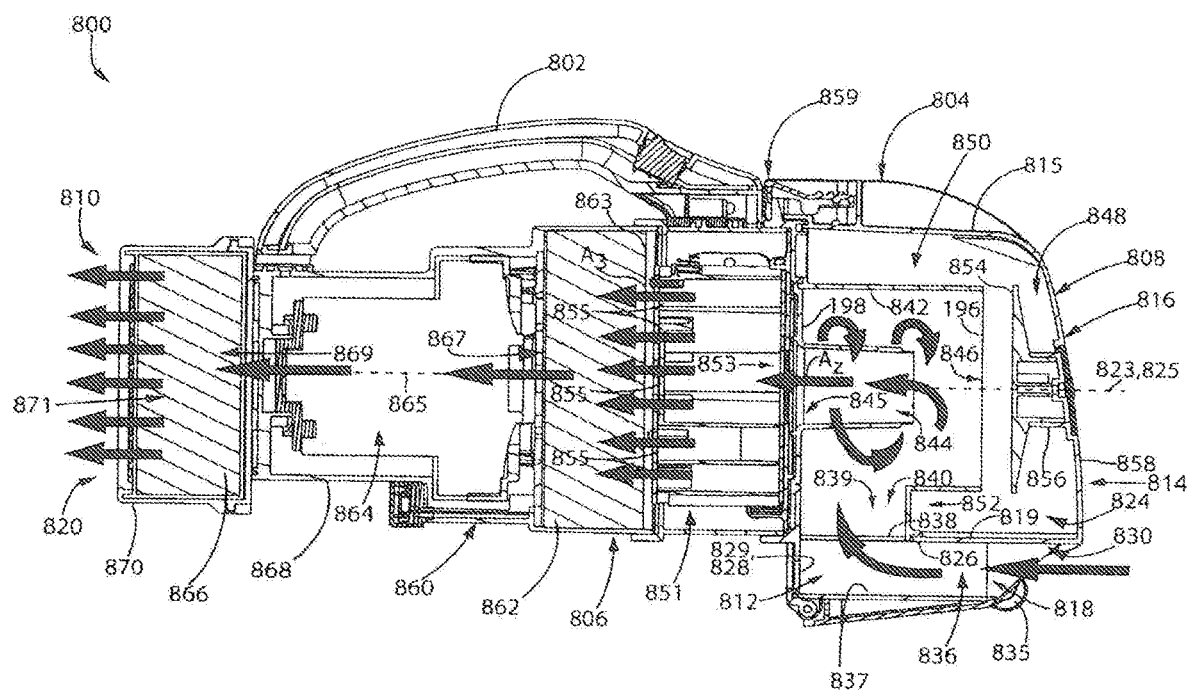

An alternate design as exemplified by FIG. 8, nozzle 812 comprises a lower wall 837, which closes lower end 834. Accordingly, nozzle 112 may be of various designs and may be an open sided passage or a closed passage. In either embodiment, it will be appreciated that nozzle 112 may be mounted or provided on cyclone unit 114 and as exemplified on a lower portion of the dirt collection chamber so as to be removable with the dirt collection chamber.

Preferably, if nozzle 112 is an open sided passage, one or more depending walls 128 extend downwardly from the upper nozzle wall 126. The depending wall is preferably generally U-shaped. In one embodiment, a depending wall is provided rearward of opening 138. In other embodiments, depending walls may alternately or in addition be provided on the lateral sides of opening 138. It is preferred that depending walls are provided on each lateral side of opening 138 and rearward thereof. Further, depending walls 128 may extend a substantial distance to the front end 108 and, preferably, essentially all the way to front end 108. The depending walls may be continuous to define a single wall as shown, or may be discontinuous. The depending walls are preferably rigid (e.g., integrally molded with cyclone unit 114). However, they may be flexible (e.g., bristles or rubber) or moveably mounted to cyclone unit 114 (e.g., hingedly mounted).

Preferably, the lower end 132 of depending wall 128 is spaced above the surface being cleaned when the hand vacuum cleaner is placed on a surface to be cleaned. As exemplified in FIG. 6, when vacuum cleaner 100 is placed on a floor F, lower end 132 of depending wall 128 is spaced a distance H above the floor. Preferably distance H is from 0.01 to 0.175 inches, more preferably from 0.04 to 0.08 inches.

The height of the depending wall (between upper nozzle wall 126 and lower end 132) may vary. In some examples, the depending wall may have a height of between about 0.05 and about 0.875 inches preferably between about 0.125 and about 0.6 inches and more preferably between about 0.2 and about 0.4 inches. The height of depending wall may vary but is preferably constant.

As exemplified, the open end of the U-shape defines an open side 130 of the nozzle 114, and forms the dirty air inlet 118 of the cleaner 100. In the example shown, the open side 130 is provided at the front of the nozzle 114. In use, when optional wheels 135 are in contact with a surface, the open side 130 sits above and is adjacent a surface to be cleaned (e.g. floor F).

In the example shown, the lower end 132 of the depending wall 128 defines an open lower end 134 of the nozzle 114. The open lower end 134 preferably extends to the front 108 of the cleaner 108, and merges with the open side 130. In use, the exemplified nozzle has an open lower end 134 that faces a surface to be cleaned.

In the example shown, a plurality of wheels 135 are mounted to the depending wall 128. It will be appreciated that wheels 135 are optional. Preferably, wheels 135 are positioned exterior to the airflow path through nozzle 112, e.g., laterally outwardly from depending wall 128. Preferably a pair of front wheels 135 is provided. Preferably, the wheels are located adjacent front 108. Optionally, one or more rear wheels 180 may be provided. In an alternate embodiment, no wheels may be provided. If wheels are provided, then preferably the wheels 135, and more specifically the lower end 194 of the wheels 135, extend lower than the lower end 132 of the depending wall 128. That is, the lower end 132 of the depending wall 128 is positioned above the lower end 194 of the wheels 135. Accordingly, in use, when wheels 135 are in contact with a surface, the lower end 132 of the depending wall 128 is spaced from a surface to be cleaned, Accordingly, some air may enter nozzle 114 by passing underneath depending wall 132. In such a case, the primary air entry to nozzle 114 is via open side 130 so that dirty air inlet 118 is the primary air inlet, and the space between the lower end of the depending wall 128 and the surface to be cleaned form a secondary dirty air inlet to the cleaner 100 (i.e. the secondary air inlet is under depending wall 128).

The upper nozzle wall 126, depending wall 128, and open lower end 134 of the nozzle 112 define the open sided airflow chamber 136 of the nozzle. In the example shown, the open sided airflow chamber 136 extends to the front 108 of the cleaner 100. In use, when wheels 135 are in contact with a horizontal surface, the nozzle 112 and the airflow chamber 136 extend generally horizontally, and preferably linearly along a nozzle axis 113 (see FIG. 7A).

If an open sided nozzle 112 is used, then an opening 138 may be provided in the upper nozzle wall 126, in communication with the airflow chamber 136. Opening 138 may be of any size and configuration and at various locations in upper nozzle wall 126. Preferably, opening 138 is positioned in the rear half of upper nozzle wall 126, forwardly of a rear portion 129 of depending wall 128. In use, when wheels 135 are in contact with a surface, the opening 138 faces a surface to be cleaned, air enters the dirty air inlet 118, passes horizontally through the airflow chamber 136, and passes into the opening 138. Opening 138 is in communication with a cyclone inlet passage 139, which is enclosed, and which is in communication with a cyclone air inlet 140 of cyclone 122. In use, when wheels 135 are in contact with a surface, cyclone air inlet 140 faces a surface to be cleaned. Accordingly, the nozzle 112 is connected in airflow communication with the cyclone 112 at the lower portion 106 of the cleaner 100.

Cyclone 122 may be of any configuration and orientation. Preferably, cyclone 122 comprises a chamber wall 142, which in the example shown, is cylindrical. The cyclone chamber is located inside chamber wall 142. The cyclone 122 extends along an axis 123, which, in the example shown, is preferably parallel to the nozzle axis, and preferably extends generally horizontally when cleaner 100 is in use and wheels 135 are seated on a surface. Cyclone 122 has a front end 196, which is towards, and preferably at the front end 108 of the hand vacuum cleaner and a rear end 198. The cyclone 122 has an air inlet 140 and an air outlet 145 which, preferably are at the same end of cyclone 122 and a dirt outlet is preferably provided at the opposite end. Preferably the air inlet and the air outlet are distal to front end 108 and a dirt outlet is proximate the front end 108. The cyclone air inlet and cyclone air outlet may be of any configuration known in the art and the cyclone air outlet may be covered by a screen or shroud or filter as is known in the art.

As exemplified, the cyclone air inlet 140 is defined by an aperture in the chamber wall 142. As can be seen in FIG. 5, the inlet passage 139 is configured such that air enters the cyclone 122 in a tangential flow path, e.g., passage 139 may be arcuate. The air travels in a cyclonic path in the cyclone, and dirt in the air is separated from the air. The air exits the cyclone via an outlet passage 144, through outlet 145. Outlet 145 is defined in a rear wall 179 of the cyclone unit 114.

As exemplified in FIG. 6, a plate 174 may be provided adjacent outlet passage 144, spaced from and facing the inlet 176 to outlet passage 144. Plate 174 may be mounted to cyclone 122 via legs 178. In the example shown, plate 174, and legs 178 form an assembly 182 that is removably mounted in cyclone 122. In some examples, a screen may be mounted around legs 178.

The dirt that is separated from the air exits the cyclone via dirt outlet 146, and enters dirt collection chamber 124. Dirt collection chamber 124 may be any dirt collection chamber. Preferably, as exemplified, dirt outlet is at the front 196 of the cyclone 122, and further, is at the front end 108 of the cleaner 100. The dirt collection chamber may be internal or external to the cyclone chamber. Preferably, as exemplified, the dirt collection chamber is external. The dirt collection chamber may be in communication with the cyclone chamber by any means known in the art. Accordingly, one or more dirt outlets may be provided. Preferably, the dirt outlet is at the end opposed to the air inlet and, preferably, the dirt outlet is at the front end 108. Preferably, the dirt outlet is at the end opposed to the air inlet and, preferably, the dirt outlet is at the front end 108

In the example shown, dirt collection chamber 124 preferably comprises two portions. A first portion 148 is provided immediately adjacent the dirt outlet 146, and is at the front 108 of the cleaner 100. A second portion 150 is concentric with the cyclone 122. A lower portion 152 of the second portion 150 is below the cyclone. As exemplified, nozzle 112 is positioned below first portion 148, and lower portion 152. Accordingly, dirt chamber 124 may comprise an annular chamber surrounding the cyclone 122.

A separation plate 154 may be provided in the dirt collection chamber 124, adjacent the dirt outlet 146, and in facing relation to the dirt outlet. The separation plate 154 aids in preventing dirt in dirt collection chamber 124 from re-entering cyclone 122. Preferably, plate 154 is spaced from dirt outlet 146 and faces dirt outlet 146. Plate 154 may be mounted by any means to any component in cyclone unit 114. As exemplified, the separation plate is mounted on an arm 156, which extends from a front wall 158 at the front 108 of the cleaner 100.

Cyclone unit 114 may be emptied by any means known in the art. For example, one of the ends of the cyclone unit 114 may be openable. For example, one of the ends of the cyclone unit 114 may be openable. In an embodiment, an openable door may be positioned at the front end of the vacuum cleaner and preferably comprises a front wall thereof. The door may be opened while the cyclone unit or the dirt collection chamber 124 is mounted to the vacuum cleaner. Alternately, or in addition, the door may be opened when the cyclone unit or the dirt collection chamber 124 has been removed from the vacuum cleaner. The door may be openably mounted to the cyclone unit, dirt collection chamber 124 or another portion of vacuum cleaner 100 by any means known in the art. For example, one or more latches 159 may secure the door in position. Alternately, the door may be opened, e.g., pivoted open, and then optionally removable. It will be appreciated that, in an embodiment wherein cyclone unit 114 is not removed as a sealed unit, dirt collection chamber 124 may be removed with nozzle 112.

Figure 4:
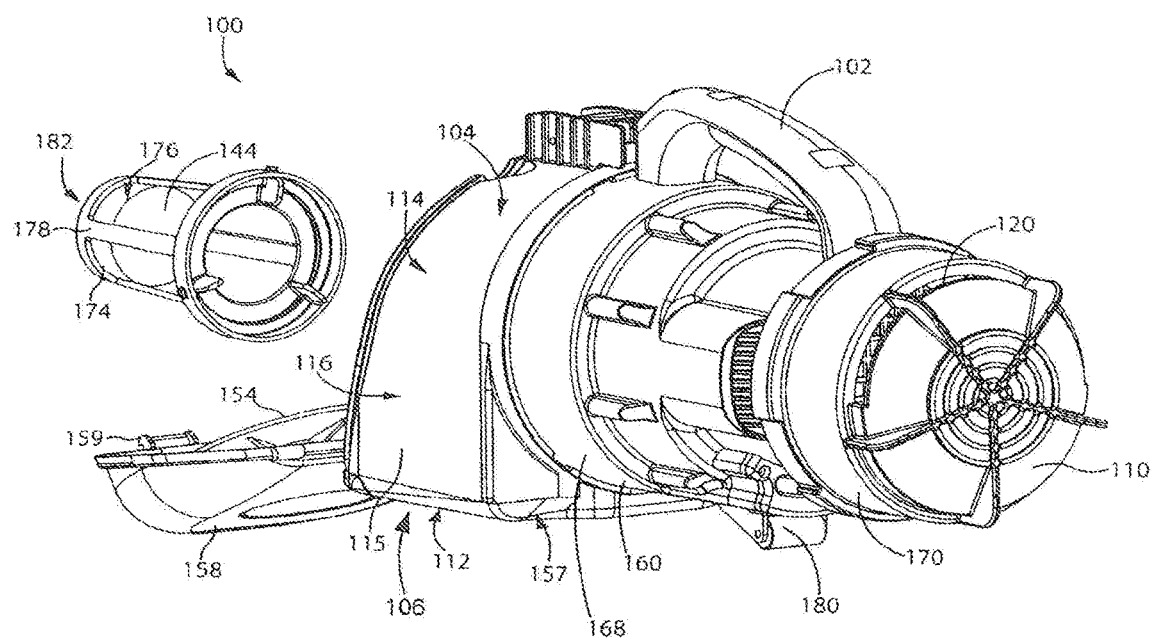
FIG. 4 is a partially exploded rear perspective view of the hand vacuum cleaner of FIG. 1.

As exemplified in FIGS. 4 and 5, front wall 158 is pivotally mounted to the cyclone unit wall 115 and serves as an openable door of the dirt chamber 124, such that dirt collection chamber 124 is openable, and dirt collection chamber 124 may be emptied. The dirt collection chamber is therefore preferably openable both, when the dirt collection chamber is mounted to the hand vacuum cleaner, or when it is removed, as will be described hereinbelow. When front wall 158 is pivoted away from the remainder of the cyclone unit 114, separation plate 154 and arm 156 also pivot away from the remainder of the cyclone unit. A latch 159 is provided, which secures front wall 158 to wall 115. In alternate examples, front wall 158 may be removable from cyclone unit wall 115, or the rear wall 179 of the cyclone unit 114 may be openable.

The rear portion of the dirt collection chamber 124 may be closed by wall 179.

The clean air exiting cyclone 122 passes through outlet 145 of outlet passage 144, exits surface cleaning head 116, and passes into the cleaner body 160. In the example shown, the cleaner body 160 is positioned rearward of the surface cleaning head 116. The cleaner body comprises a suction motor housing 168, which houses a suction motor 164 and may also house an optional pre-motor filter 162 and/or an optional post-motor filter 166.

In the example shown, suction motor housing 168 further houses a pre-motor filter 162. Preferably, as shown in the exemplified embodiments, the vacuum cleaner has a linear configuration. Accordingly, pre-motor filter 162 is provided in the airflow path adjacent and downstream of the outlet passage 144, and facing the outlet 145. Pre-motor filter 162 serves to remove remaining particulate matter from air exiting the cyclone 122, and may be any type of filter, such as a foam filter. One or more filters may be used. If the vacuum cleaner is of a non-linear configuration, then pre-motor filter 162 need not be located adjacent outlet passage 144.

Suction motor 164 is provided in the airflow path preferably adjacent and downstream of the pre-motor filter 162. The suction motor 164 may be any type of suction motor. The suction motor draws air into the dirty air inlet 118 of the cleaner 100, through the airflow path past the suction motor 164, and out of the clean air outlet 120. The suction motor 164 has a motor axis 165. In the example shown, the motor axis 165 and the cyclone axis 123 preferably extend in the same direction and are preferably generally parallel. In the exemplified embodiments, the vacuum cleaner has a linear configuration. If the vacuum cleaner is of a non-linear configuration, then motor 164 need not be located adjacent pre-motor filter 162.

The cleaner body 160 preferably further comprises a post-motor filter housing 170. A post motor filter 166 is provided in the post-motor filter housing 170. The post motor filter 166 is provided in the airflow path downstream of, and preferably adjacent, the suction motor 164. Post motor filter 166 serves to remove remaining particulate matter from air exiting the cleaner 100. Post-motor filter 166 may be any type of filter, such as a HEPA filter. If the vacuum cleaner is of a non-linear configuration, then post motor filter 166 need not be located adjacent suction motor 164.

Clean air outlet 120 is provided downstream of post-motor filter 166. Clean air outlet 120 may comprise a plurality of apertures formed in housing 170.

As exemplified in FIG. 7B, in one aspect of this invention, the dirt collection chamber 124 is removable from the hand vacuum cleaner 100 as a sealed unit for emptying. It will be appreciated that this aspect may be used by itself or in any particular combination or sub-combination of any one or more of the features set out herein.

In accordance with another aspect of the invention, when cyclone unit 114 is removed from the cleaner 100, nozzle 112 is also removed from the cleaner 100. It will be appreciated that this aspect may be used by itself or in any particular combination or sub-combination of any one or more of the features set out herein. In one particular embodiment, both aspects may be used.

For example, in the example shown, the dirt collection chamber 124 is integrally formed with cyclone wall 142, and with nozzle 112, and the cyclone unit 114 comprises the dirt collection chamber 124. Accordingly, the cyclone unit 114 is removable from the hand vacuum cleaner. As the cyclone unit 114 is integral with nozzle 112 and airflow chamber 136, nozzle 112 and airflow chamber 136 are removable from the cleaner 100 with cyclone unit 114.

In other embodiments, one or more of these components may be separately manufactured and then assembled together (e.g., by an adhesive, mechanical means such as screws or welding, to form a one-piece assembly.

It will be appreciated that if dirt chamber 124 is removably mounted to cyclone unit 114, then nozzle 112 is removable together with dirt chamber 124 from vacuum cleaner 100. It will be appreciated that this aspect may be used by itself or in any particular combination or sub-combination of any one or more of the features set out herein.

In other embodiments, the dirt collection chamber 124 may be removable from the hand vacuum cleaner 100 alone, without the cyclone unit 114 or the nozzle 112.

As can be seen in FIG. 7B, when the cyclone unit 114 is removed from the hand vacuum cleaner, and particularly from motor housing 168, it is sealed, except for the fluid flow passages leading to and from the first cyclone unit (i.e. opening 138 and outlet 145). That is, wall 179 seals the air outlet end of cyclone unit 114 and front wall 158 seals the front end of the cyclone unit 114. In order to empty the dirt collection chamber 124, the front wall 158 or the rear wall 179 may be opened, and the dirt may be emptied from dirt chamber 124.

As exemplified, in order to remove cyclone unit 114 from the surface cleaning apparatus, the cyclone unit comprises a first mounting member 173, and the suction motor housing 168 has a second mounting member 175. The first 173 and second 175 mounting members are releasably engageable with each other. In the example shown, the first 173 and second 175 mounting members comprise a bayonet mount. In alternate examples, the first and second mounting members may be another type of mounting member, such as mating screw threads, magnets, mechanical fasteners such as screws or any other type of mounting members. It will be appreciated that if dirt collection chamber 124 is removably mounted to cyclone unit 114, then any such removable securing mechanism may be used.

Removing the cyclone unit 114 from the hand vacuum cleaner may be advantageous, because it may allow a user to wash the cyclone unit 114, for example using water, without risking wetting and shorting the suction motor 164.

One or more additional wheels 180 may be mounted to housing 161, preferably at lower portion 106, and may be used in conjunction with wheels 135. Preferably, a single rear wheel 180 is provided. Preferably, rear wheel 180 is located on a centre line of the vacuum cleaner and rearward of the depending wall 128.

Referring now to FIG. 8, in which like numerals refer to like features, with the first digit incremented to 8 to refer to the figure number, an alternate example of a hand vacuum cleaner 800 is shown. As discussed previously, nozzle 812 comprises a lower wall 837, which closes lower end 834. Accordingly, in contrast to cleaner 100, nozzle 812 comprises an enclosed airflow passage 836. Further, in this example, front wall 858 is not pivotally mounted to wall 815. Rather, wall surface cleaning head 816 is pivotally mounted to body 860.

Cleaner 800 may further comprise a second optional cyclone unit 851 downstream of the first cyclone unit 814, between first cyclone unit 814 and pre-motor filter 862. In the example shown, the second cyclone unit 851 comprises a plurality of cyclones in parallel. Each of the plurality of cyclones is parallel to the first cyclone axis 823.

The invention claimed is:

1. A hand vacuum cleaner comprising:
   (a) a front end and a rear end;
   (b) an air flow passage extending from a dirty air inlet of the hand vacuum cleaner to a clean air outlet of the hand vacuum cleaner;
   (c) a cyclone unit positioned in the air flow passage upstream from a suction motor and comprising a front unit end, a rear unit end comprising a rear wall, a cyclone unit air inlet, a cyclone unit air outlet, a central axis extending in an axial direction between the front end and the rear end of the hand vacuum cleaner, and a first cyclonic stage and a dirt collection chamber, the cyclone unit having an openable end which opens the first cyclonic stage and the dirt collection chamber, the cyclone unit air outlet having a direction of flow;
   (d) the first cyclonic stage comprising a front end, a rear end, and a cyclone comprising a first stage cyclone air inlet, a first stage cyclone air outlet, a cyclone sidewall surrounding a cyclone chamber, and a cyclone axis of rotation extending in the axial direction, wherein the dirt collection chamber is a distinct chamber from the cyclone chamber;
   (e) a foam pre-motor filter which, in use, is positioned in a pre-motor filter housing and is positioned in the air flow passage downstream from the first stage cyclone air outlet, the foam pre-motor filter having an area in a direction transverse to the cyclone axis that is larger than an area of the cyclone unit air outlet in the direction transverse to the cyclone axis, the pre-motor filter housing comprising a first portion and a second portion;
   (f) a cleaner body including the suction motor, the suction motor is positioned in the air flow passage downstream from the foam pre-motor filter, the suction motor having a motor axis and a downstream end;
   (g) a post-motor filter positioned in the air flow passage downstream from the suction motor; and,
   (h) a handle,
   wherein the pre-motor filter housing has an outer perimeter defining a housing volume and the central axis, the cyclone axis and the motor axis each extend through a central portion of the housing volume, and
   wherein the cyclone axis is generally parallel to the motor axis, and
   wherein the first cyclonic stage has a first cross-sectional area in a first plane that is transverse to the cyclone axis and is located midway between the front and rear ends of the first cyclonic stage, the first cyclonic stage has a second cross-sectional area in a second plane that is transverse to the cyclone axis and is located at the openable end and the second cross-sectional area is generally equal to the first cross-sectional area of the first cyclonic stage, and
   wherein the first cyclonic stage is removable from the cleaner body with the openable end in a closed position and when the first cyclonic stage is removed from the cleaner body, the first portion of the pre-motor filter housing is removed from the second portion of the pre-motor filter housing whereby the pre-motor filter housing is opened, and
   wherein, when the first cyclonic stage is removed, the foam pre-motor filter remains in position in the first portion of the pre-motor filter housing and is accessible for removal, and
   wherein the cyclone unit air outlet comprises a port in the rear wall of the cyclone unit and, in operation to clean a surface, the pre-motor filter is positioned rearward of the rear wall.

2. The hand vacuum cleaner of claim 1 wherein the openable end has a radial centre and the cyclone axis and the motor axis extend through the radial centre.

3. The hand vacuum cleaner of claim 1 wherein the motor axis and the cyclone axis are co-axial.

4. The hand vacuum cleaner of claim 1 further comprising a second cyclonic stage downstream of the first cyclonic stage wherein the cyclone axis extends through a central portion of the second cyclonic stage and, when the first cyclonic stage is removed from the cleaner body, the second cyclonic stage is concurrently removed from the cleaner body.

5. The hand vacuum cleaner of claim 1 wherein the dirty air inlet is provided at the front end of the hand vacuum cleaner.

6. The hand vacuum cleaner of claim 5 wherein air travels rearwardly from the dirty air inlet to the cyclone air inlet of the first cyclonic stage.

7. The hand vacuum cleaner of claim 6 wherein the cyclone air inlet of the first cyclonic stage is located at a rear end of the first cyclonic stage.

8. The hand vacuum cleaner of claim 5 wherein air travels in the axial direction from the dirty air inlet to the cyclone air inlet of the first cyclonic stage.

9. A hand vacuum cleaner comprising:
(a) a front end and a rear end spaced apart from the front end in an axial direction;
(b) an air flow passage extending from a dirty air inlet of the hand vacuum cleaner to a clean air outlet of the hand vacuum cleaner, wherein the dirty air inlet is provided at the front end of the hand vacuum cleaner;
(c) a cyclone unit positioned in the air flow passage upstream from a suction motor and comprising a front unit end, a rear unit end comprising a continuous rear end wall, a cyclone unit air inlet, a cyclone unit air outlet, a cyclone unit sidewall extending in the axial direction between the front unit end and the rear unit end, and a first cyclonic stage;
(d) the first cyclonic stage provided at the front end of the hand vacuum cleaner, the first cyclonic stage comprising a front end, a rear end, a cyclone comprising a cyclone chamber, the cyclone having a cyclone air inlet, a first stage cyclone air outlet, a rear end wall and a cyclone axis extending in the axial direction, the first stage cyclone air outlet having a direction of flow;
(e) a foam pre-motor filter which, in use, is positioned in a pre-motor filter housing wherein the foam pre-motor filter is positioned in the air flow passage downstream from the first cyclonic stage, the pre-motor filter housing comprising a first portion and a second portion; and,
(f) a cleaner body including the suction motor, the suction motor is positioned in the air flow passage downstream from the pre-motor filter, the suction motor having a motor axis and a downstream end;
wherein the cyclone unit air outlet comprises a port in the rear end wall, the port being transverse to the cyclone axis, and the cyclone unit sidewall at the rear unit end of the cyclone unit is closed by the rear end wall other than at the port, and
wherein a front end of the pre-motor filter housing is defined by the rear end wall of the cyclone unit and, in operation to clean a surface, the pre-motor filter is positioned rearward of the rear end wall, and
wherein the pre-motor filter housing has an outer perimeter defining a housing volume, and the cyclone axis extends through the housing volume, and
wherein the cyclone unit is removable from the cleaner body in a closed position, and when the cyclone unit is removed from the cleaner body, a portion of the pre-motor filter housing is removed with the cyclone unit whereby the pre-motor filter housing is opened, and
wherein, when the cyclone unit is removed, the foam pre-motor filter remains in position in the first portion of the pre-motor filter housing and is accessible for removal, and
wherein the cyclone unit further comprises a dirt collection chamber that is a distinct volume from the cyclone chamber and is radially spaced from the cyclone chamber, and the cyclone unit has an openable end which opens the cyclone chamber and the dirt collection chamber.

10. The hand vacuum cleaner of claim 9 wherein the motor axis and the cyclone axis are co-axial.

11. The hand vacuum cleaner of claim 9 further comprising a post motor filter and the foam pre-motor filter has an area in a direction transverse to the axial direction that is different to an area of the post motor filter in the direction transverse to the axial direction.

12. The hand vacuum cleaner of claim 9 wherein the suction motor has an area in a direction transverse to the axial direction that is smaller than an area of the foam pre-motor filter in the direction transverse to the axial direction.

13. The hand vacuum cleaner of claim 9 further comprising a post-motor filter positioned in the air flow passage downstream from the suction motor, the post-motor filter has a curved outer perimeter that defines a volume, the volume has a radially inner central portion and the cyclone axis and the motor axis each extend through the central portion of the volume.

14. The hand vacuum cleaner of claim 9 wherein the first cyclonic stage has a first cross-sectional area in a first plane that is transverse to the cyclone axis and is located at the front end of the first cyclonic stage, the first cyclonic stage has a second cross-sectional area in a second plane that is transverse to the cyclone axis and is located at the rear end of the first cyclonic stage and the second cross-sectional area is generally equal to the first cross-sectional area of the openable end.

15. The hand vacuum cleaner of claim 1 wherein a radial outer peripheral wall of the foam pre-motor filter abuts an inner surface of the pre-motor filter housing.

16. A hand vacuum cleaner comprising:
(a) a front end and a rear end spaced apart from the front end in an axial direction;
(b) an air flow passage extending from a dirty air inlet of the hand vacuum cleaner to a clean air outlet of the hand vacuum cleaner, wherein the dirty air inlet is provided at the front end of the hand vacuum cleaner;
(c) an air treatment unit positioned in the air flow passage upstream from a suction motor and comprising a front unit end, a rear unit end comprising a continuous rear end wall, an air treatment unit air inlet, an air treatment unit air outlet, an air treatment unit sidewall extending in the axial direction between the front unit end and the rear unit end, and an air treatment chamber;
(d) the air treatment chamber provided at the front end of the hand vacuum cleaner, the air treatment chamber comprising a front end, a rear end, an air treatment chamber air inlet, an air treatment chamber air outlet and a longitudinal axis extending in the axial direction;
(e) a foam pre-motor filter which, in use, is positioned in a pre-motor filter housing wherein the foam pre-motor filter is positioned in the air flow passage downstream from the air treatment chamber, the pre-motor filter housing comprising a first portion and a second portion; and,
(f) a cleaner body including the suction motor, the suction motor is positioned in the air flow passage downstream from the foam pre-motor filter, the suction motor having a motor axis and a downstream end;
wherein the air treatment unit air outlet comprises a port in the rear end wall, the port being transverse to the longitudinal axis, and the air treatment unit sidewall at the rear unit end of the air treatment unit is closed by the rear end wall other than at the port, and
wherein, in operation to clean a surface, the pre-motor filter is positioned rearward of the rear end wall of the air treatment unit, and
wherein the pre-motor filter housing has an outer perimeter defining a housing volume, and the longitudinal axis extends through the housing volume, and wherein the air treatment unit is removable from the cleaner body with the air treatment unit in a closed position, and when the air treatment unit is removed from the cleaner body, the first portion of the pre-motor filter housing is removed from the second portion of the pre-motor filter housing whereby the pre-motor filter housing is opened, and wherein, when the air treatment unit is removed, the foam pre-motor filter remains in position in the first portion of the pre-motor filter housing and is accessible for removal, and wherein the air treatment unit further comprises a dirt collection chamber that is a distinct volume from the air treatment chamber and is radially spaced from the air treatment chamber, and the air treatment unit has an openable end which opens the air treatment chamber and the dirt collection chamber.

17. The hand vacuum cleaner of claim 16 wherein the foam pre-motor filter is made of a filter media that has an outer generally axially extending perimeter wall and the perimeter wall abuts an inner surface of the pre-motor filter housing when the foam pre-motor filter is positioned in the pre-motor filter housing.

18. The hand vacuum cleaner of claim 1 wherein the dirt collection chamber comprises a first portion adjacent a dirt outlet of the cyclone and a second portion at least partially concentric to the cyclone.

\* \* \* \* \*